(12) United States Patent
Schlintl

(10) Patent No.: US 10,559,043 B1
(45) Date of Patent: Feb. 11, 2020

(54) VISUALIZATION TOOL FOR DISPLAYING AND CONFIGURING ROUTING PATHS AND RELATED ATTRIBUTES FOR TASKS PERFORMED IN MANUFACTURING PROCESSES

(71) Applicant: Flextronics AP, LLC., Broomfield, CO (US)

(72) Inventor: Martin Schlintl, Glan (AT)

(73) Assignee: Flextronics AP, LLC., Broomfield, CO (US)

( * ) Notice: Subject to any disclaimer, the term of this patent is extended or adjusted under 35 U.S.C. 154(b) by 136 days.

(21) Appl. No.: 15/424,275

(22) Filed: Feb. 3, 2017

Related U.S. Application Data

(60) Provisional application No. 62/412,413, filed on Oct. 25, 2016, provisional application No. 62/414,390, filed on Oct. 28, 2016.

(51) Int. Cl.
*G06Q 10/06* (2012.01)
*G06Q 50/04* (2012.01)

(52) U.S. Cl.
CPC ....... *G06Q 50/04* (2013.01); *G06Q 10/06316* (2013.01)

(58) Field of Classification Search
CPC .... G06Q 50/04; G06Q 10/0631; G06Q 10/06; G06Q 10/06316
See application file for complete search history.

(56) References Cited

U.S. PATENT DOCUMENTS

| | | | | |
|---|---|---|---|---|
| 5,195,041 A | * | 3/1993 | George | G05B 19/41885 700/100 |
| 5,946,661 A | * | 8/1999 | Rothschild | G05B 19/41865 377/16 |
| 6,198,980 B1 | * | 3/2001 | Costanza | G05B 19/41865 700/97 |

(Continued)

OTHER PUBLICATIONS

Cho, Hyunbo, An Intelligent Workstation Controller For Computer Integrated Manufacturing Texas A&M University, Doctoral Thesis, Dec. 1993 (Year: 1993).*

(Continued)

*Primary Examiner* — Scott L Jarrett
(74) *Attorney, Agent, or Firm* — Haverstock & Owens LLP

(57) ABSTRACT

A standard time system provides a methodology and structure to calculate standard times for both manufacturing tasks and support tasks, based on task specific formulas, recursive algorithms for breaking down tasks into any granularity of actions and steps, routing structures for defining standard routing and alternative routing, and a linking matrix to link all related attributes such that a change in one variable value and/or calculated standard time is propagated through the entire manufacturing process. Access to the standard time system is provided by a visualization tool, which includes a graphical user interface (GUI). The visualization tool provides the user a visual representation of the full manufacturing process and the means for defining, recording and maintaining the related data and structure. Individual tasks are defined for the manufacturing of each product, and standard times are attributed to each defined task by formula based calculations.

16 Claims, 18 Drawing Sheets

(56) References Cited

U.S. PATENT DOCUMENTS

| | | | | |
|---|---|---|---|---|
| 6,611,727 | B2* | 8/2003 | Bickley | G06Q 10/06 |
| | | | | 700/102 |
| 6,947,905 | B1 | 9/2005 | Starr, I | |
| 7,346,534 | B1 | 3/2008 | Martin | |
| 8,306,644 | B2* | 11/2012 | Gozzi | G05B 19/41885 |
| | | | | 700/97 |
| 2002/0128810 | A1* | 9/2002 | Craig | G05B 17/02 |
| | | | | 703/17 |
| 2003/0177050 | A1 | 9/2003 | Crampton | |
| 2004/0122724 | A1 | 6/2004 | Wei | |
| 2004/0230447 | A1 | 11/2004 | Schwerin-Wenzel | |
| 2004/0254805 | A1 | 12/2004 | Schwerin-Wenzel | |
| 2006/0254862 | A1 | 11/2006 | Hoerston | |
| 2007/0192157 | A1 | 8/2007 | Gooch | |
| 2007/0276717 | A1 | 11/2007 | Aburey | |
| 2008/0155015 | A1 | 6/2008 | Jensen | |
| 2008/0201192 | A1 | 8/2008 | Ueno | |
| 2008/0288417 | A1 | 11/2008 | Luessi | |
| 2011/0225023 | A1 | 9/2011 | Evens | |
| 2016/0364670 | A1* | 12/2016 | Lin | G06Q 10/06316 |

OTHER PUBLICATIONS

Sly, David Paul, A method of industrial plant layout and material flow analysis in AutoCAD Iowa State University, Thesis, 1990 (Year: 1990).*

Alfredsson, Simon et al., Assembly system design—Case study of a mixed model production May 15, 2012 (Year: 2012).*

Fraser, Allan et al., Ecapp: A Process-Planning Tool Using Artificial Intelligence IAAI-90 Proceedings, 1990 (Year: 1990).*

Teamcenter manufacturing process management v10.1—Manufacturing Process Planner Guide Siemens Product Lifecycle Management Software Inc., 2013 (Year: 2013).*

Oracle Flow Manufacturing—User Guide Release 11 Oracle, Feb. 2001 (Year: 2001).*

ProModel 2011—User Guider ProModel Corporation, Jun. 2, 2011 (Year: 2011).*

Mathews, Carl Warren Jr., An Experimental Application of Industrial Engineering Techniques To Department Store Operations Georgia Institute of Technology, 1951 (Year: 1951).*

Alkan, Bugra et al., A model for complexity assessment in manual assembly operations through predetermined motion systems Procedia CIRP vol. 44, 2016 (Year: 2016).*

Permata, Luisa et al., Work Measurement Approach To Determine Standard Time In Assembly Line International Journal of Management and Applied Science, vol. 2, No. 10, Oct. 2016 (Year: 2016).*

Miller, Michael G. et al., Manufacturing Assembly Time Estimation Using Structural Complexity Metric Trained Artificial Intelligence Neural Networks, Clemson University, Jan. 2014 (Year: 2014).*

Messina Productivity: Measurement Formulas For The Indirect Workforce, Perspectives on Business and Economics, Lehigh Preserve, 1983.

Krajewski et al., "Learning Curve Anlaysis", Operations Management, Pearson Education Inc., 2010.

Non-final office action dated Mar. 8, 2018. U.S. Appl. No. 14/597,977, filed Jan. 15, 2015, applicant.: Krystian Zbikowski, 38 pages.

"Work Measurement Learning, Curves and Standards", OM Supplementary Chapter A, (File Last Modified Jul. 13, 2005), Collier and Evans(Year: 2005), 23 pages.

Non-final office action dated Apr. 15, 2019, U.S. Appl. No. 15/135,303, filed Apr. 21, 2016, Applicant: Martin Schlintl, 77 pages.

* cited by examiner

|  | task 710 | task 720 | task 900 (-n) |
|---|---|---|---|
| Support task 100 |  | x |  |
| Support task 150 | x |  | x |
| Support task 200 (-n) |  |  | x |

Fig. 4

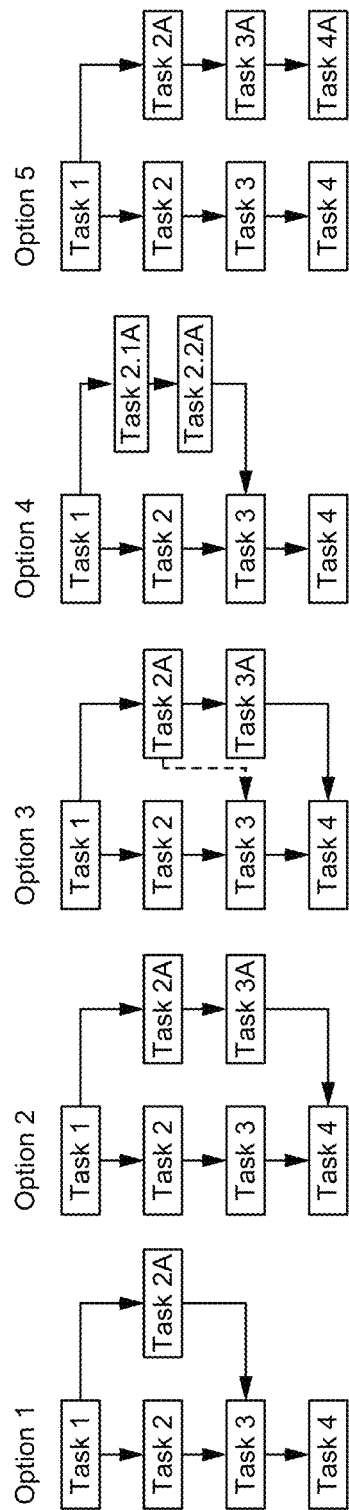
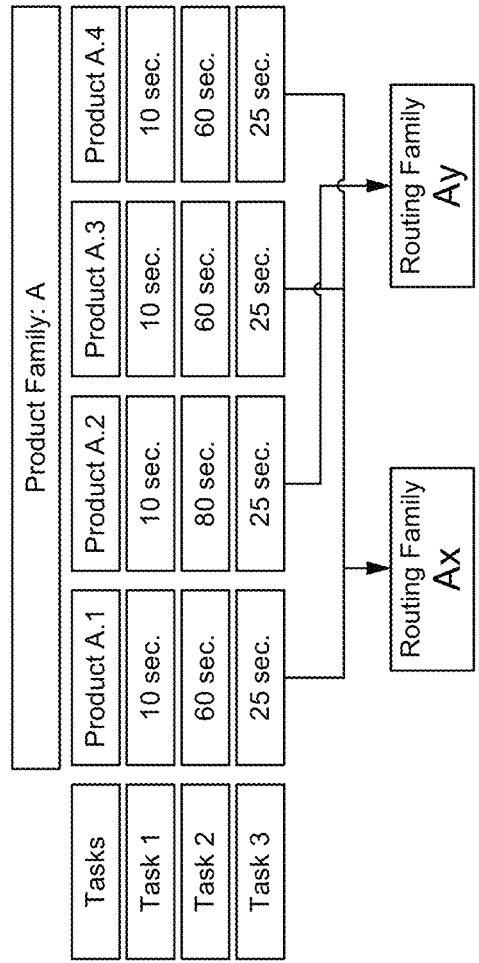
Fig. 7
Fig. 8

| | | | |
|---|---|---|---|
| Quick Edit - Test_MS | | | ✕ |

For the complex operation design, please click the Link.

| | | | |
|---|---|---|---|
| Task Code | 710 | Operation Code | 710 |
| Operation Name | SMT Reflow A | | |
| Work Center | W471FB | SMT-F - uBlox | |
| Machines | LIINE/F | 2x D4 / D1 | |
| Machine Occupation | 1 | | |
| Setup Time per Prod. Order | 12 min. | Man Occupation Setup | 0 |
| C/T for Production | 120 sec. | Man Occupation | 2.5 |
| Units per Cycle | 40 QTY | Net C/T for Production | 3.00 sec/unit |
| Allowance | Equipment ⌄ | | |
| Allowance | AllowanceTest(EX)(4.00%) ⌄ | | |
| Gross C/T for Production | 3.12 sec. | 0.052 | min. |
| Re-processing Rate | 0 % | Production rate | 1153.85 UPH |
| Efficiency % for Planning | 85.00 % | Planning UPH | 980.77 UPH |
| Transfer lot 100% | YES ⊙ | Transfer lot QTY | |
| Count Point | YES ⊙ | Save&Close | Discard&Close |

Fig. 12

| | | Status | Routing Id | Routing Name | Mapped Items | Effective Date | Exp Date | Update Date | Update User | Create Date | Create User |
|---|---|---|---|---|---|---|---|---|---|---|---|
| 1 | □ | (Moved to Baan) | 39 | R-Expo-2 | | 08-31-2016 | | 09-02-2016 17:42:19 | altmschl | 08-29-2016 12:28:00 | gsslakpv |
| 2 | □ | (Moved to Baan) | 42 | R_NEW-02 | | 09-01-2016 | | 09-02-2016 17:26:03 | altmschl | 09-01-2016 12:19:46 | gsslakpv |
| 3 | □ | Initial | 44 | TESTROUTING1 | | 09-02-2016 | | 09-02-2016 16:43:29 | mcnhaqiu | 09-02-2016 11:17:08 | mcnhaqiu |
| 4 | □ | Initial | 43 | R_CHECK | | 09-08-2016 | | 09-01-2016 18:01:05 | gsslakpv | 09-01-2016 18:01:05 | gsslakpv |
| 5 | □ | Initial | 41 | R_NEW-01 | | 09-01-2016 | | 09-01-2016 12:13:32 | gsslakpv | 09-01-2016 12:13:32 | gsslakpv |
| 6 | □ | Initial | 40 | R_QA-1 | | 10-02-2016 | | 08-31-2016 18:02:22 | mcnhaqiu | 08-31-2016 13:31:36 | gsslakpv |
| 7 | ☑ | (Moved to Baan) | 38 | R-Expo-1 | 0014081-01 STATION SW-B | | | 08-29-2016 12:19:55 | gsslakpv | 08-29-2016 12:19:55 | gsslakpv |
| 8 | □ | Mature | 37 | RajeshRout4 | | | | 08-29-2016 09:00:51 | mcnhaqiu | 08-29-2016 19:16:03 | gssjrajd |
| 9 | □ | Initial | 36 | RajeshRout3 | | | | 08-26-2016 19:13:17 | gssjrajd | 08-26-2016 19:13:17 | gssjrajd |
| 10 | □ | Initial | 35 | New Routing14 | | | | 08-26-2016 18:15:55 | gssjrajd | 08-26-2016 18:15:55 | gssjrajd |

Fig. 17

| | ItemCode ⬍ | RoutingId | RoutingName | RoutingCode | Update Date ⬍ | Update User |
|---|---|---|---|---|---|---|
| 1 🚫 | YASEMASTER | 69 | Test 5 | vvvv | 09-02-2016 17:42:19 | altmschl |
| 2 🚫 | YASEMASTER | 62 | Test 3 | vvvv | 09-02-2016 17:26:03 | altmschl |
| 3 🚫 | YASEMASTER | 60 | Test 1 | | 09-02-2016 16:43:29 | mcnhaqiu |

Item Mapping Routing
YASEMASTER
XL
input routing here...
✗ Add in Mapping
Mapping Detail
View 1 - 3 of 3    « ‹ Page 1 of 1 › » 10

Fig. 18

StaTiS

Althofen (ALT) - 471   Martin Schlintl (altmschl)

- Home
- Routing
- Operations
- Configuration
  - Allowance
    - User
    - Role
    - Site Home > Allowance

Search

| Allowance Name | | Allowance Type | | Allowance(%) | |
|---|---|---|---|---|---|
| Exp Date | | Active | | Effective Date | | Query |

| | | Allowance Name | Allowance Type | Allowance (%) | Effective Date | Exp Date | Created By | Created Date | Updated By | Updated Date |
|---|---|---|---|---|---|---|---|---|---|---|
| 1 | ✎ | Allowance ALG manual non n | Manual | 11 | 06-09-2016 | | altgengl | 09-06-2016 15:11:51 | altgengl | 09-20-2016 17:23:15 |
| 2 | ✓ | Allowance SMT (Test) | Equipment | 15 | 19-09-2016 | | altafran | 09-19-2016 14:37:29 | altafran | 09-19-2016 14:37:57 |
| 3 | ✓ | AllowanceTest(E) | Equipment | 4 | 03-09-2016 | | mcnhaqiu | 09-03-2016 08:38:43 | mcnhaqiu | 09-03-2016 08:38:43 |
| 4 | ✓ | AllowanceTest(M) | Manual | 7 | 03-09-2016 | | mcnhaqiu | 09-03-2016 08:38:28 | mcnhaqiu | 09-03-2016 08:38:28 |
| 5 | ✎ | Manual Standard | Manual | 12 | 20-09-2016 | | altafran | 09-20-2016 13:30:46 | altafran | 09-20-2016 13:30:46 |
| 6 | ✓ | Trial | Manual | 10 | 07-09-2016 | | puncmaha | 09-07-2016 12:05:41 | altafran | 09-19-2016 14:37:47 |

View 1 - 6 of 6         | Page 1 of 1 |  10

Fig. 19

VISUALIZATION TOOL FOR DISPLAYING AND CONFIGURING ROUTING PATHS AND RELATED ATTRIBUTES FOR TASKS PERFORMED IN MANUFACTURING PROCESSES

RELATED APPLICATIONS

This Patent Application claims priority under 35 U.S.C. 119 (e) of the U.S. Provisional Application, Ser. No. 62/412,413, filed Oct. 25, 2016, and entitled "Standard Time System for Direct Labor Planning" and the U.S. Provisional Application, Ser. No. 62/414,390, filed Oct. 28, 2016, and entitled "Standard Time System for Direct Labor Planning". This application incorporates U.S. Provisional Application, Ser. No. 62/412,413 and U.S. Provisional Application, Ser. No. 62/414,390 in their entireties by reference.

FIELD OF THE INVENTION

The present invention is generally directed to manufacturing processes and planning More specifically, the present invention is directed to methodologies and structures used to plan manufacturing process routing, manufacturing tasks and support tasks, record and maintain standard times associated with each.

BACKGROUND OF THE INVENTION

Product manufacturing typically requires complex planning and organization, especially for large manufacturing facilities that make multiple products. A series of process steps and resources are defined for the manufacturing of each product. Standard times are assigned to each process step. Proper process planning, resource allocation and accurate standard times are necessary for efficient operations. Improvements in any or all of these factors, both in the initial set up for manufacturing and for on-going operation, are highly desired.

SUMMARY OF THE INVENTION

The standard time system provides the methodology and structure to calculate and maintain standard times for both manufacturing tasks and support tasks, based on task specific formulas, recursive algorithms for breaking down tasks into any granularity of actions and steps, routing structures for defining standard routing and alternative routing, and a linking matrix to link all related attributes such that a change in one variable value and/or calculated standard time is propagated through the entire manufacturing process. Access to the standard time system is provided by a visualization tool, which includes a graphical user interface (GUI). The visualization tool provides the user a visual representation of the full manufacturing process and the means for defining, recording and maintaining the related data and structure. Individual tasks are defined for the manufacturing of each product, and standard times are attributed to each defined task by formula based calculations. The standard time system can link to ERP systems and management applications for reporting and managing purposes. The standard time system outlines the entire process as well as alternative means for manufacturing the same product based on available on-site resources.

BRIEF DESCRIPTION OF THE DRAWINGS

Several example embodiments are described with reference to the drawings. The example embodiments are intended to illustrate, but not to limit, the invention. The drawings include the following figures:

FIG. 4 illustrates an exemplary linking matrix between three support tasks and three manufacturing tasks.

FIG. 7 illustrates a simplified example of a standard routing and some possible alternative routings.

FIG. 8 illustrates exemplary routing families as applied to an exemplary product family.

FIG. 12 illustrates the Quick-Create-Task form populated with exemplary data.

FIG. 17 illustrates a screen shot of an exemplary GUI routing overview tool.

FIG. 18 illustrates a screen shot of an exemplary GUI item mapping routing tool.

FIG. 19 illustrates a screen shot of an exemplary GUI configuration menu tool.

DETAILED DESCRIPTION OF THE EMBODIMENTS

Figure 1:
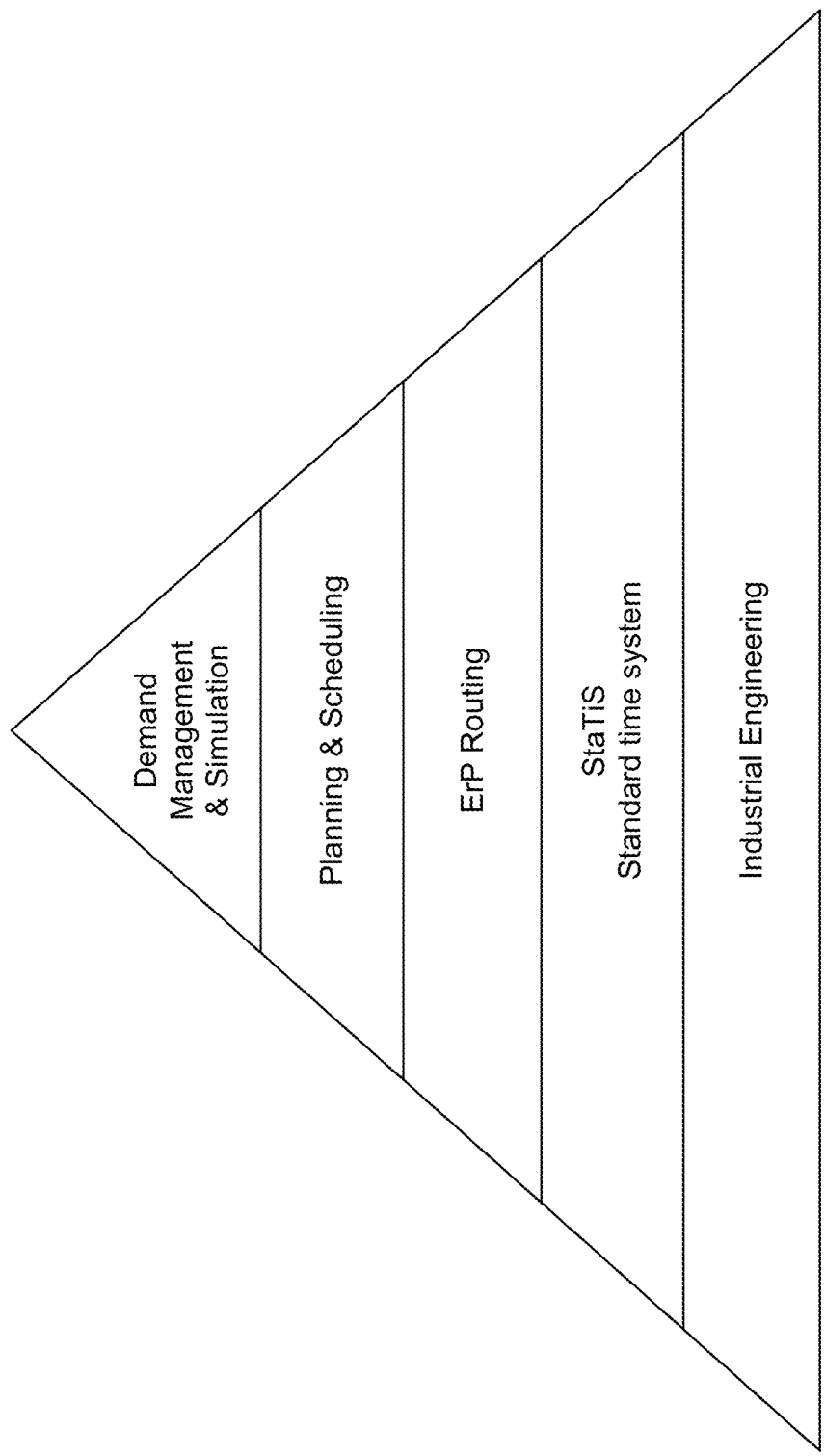
FIG. 1 illustrates a conceptual block diagram of a planning process that includes the standard time system.

Embodiments of the present application are directed to a standard time system. Those of ordinary skill in the art will realize that the following detailed description of the standard time system is illustrative only and is not intended to be in any way limiting. Other embodiments of the standard time system will readily suggest themselves to such skilled persons having the benefit of this disclosure.

Reference will now be made in detail to implementations of the standard time system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Manufacturing a product is defined as a series of process steps that are performed. As used herein, a task is a process step in the manufacturing process, such as drilling manual assembly, cutting and testing. Activities, steps and actions can be process steps at a next granularity level below a task. Since "tasks", "activities", "steps" and "actions" all relate to actionable processes, the specific use of such terms is simply relative and generally can be considered interchangeable. In general, a task is a single activity or a series of activities performed in order to manufacture a product or deliver a service. Each task can be defined according to any level of granularity, such as the aforementioned activities, steps and/or actions. Although described herein as referring to the manufacturing of a product, the concepts can be applied to delivering a service. As used herein, the standard time system refers to the methodology and structure used to define each of the tasks, their sequence, the routing of materials through the tasks and the corresponding standard times of each task for a specific product to be manufactured.

The standard time is the total time required by the equivalent of an average skilled operator working at a normal pace, to perform a specified series of tasks using prescribed methods. Standard time includes appropriate allowances to allow for personal time, recovery from fatigue, and, where necessary, an additional allowance to cover delays which may occur but have not been observed.

The standard time system incorporates industry standards for standard time values and industrial engineering principles used to determine direct labor staffing requirements. Industrial engineering is a branch of engineering which deals with the optimization of complex processes or systems. Industrial engineering is concerned with the development, improvement, and implementation of integrated systems of people, money, knowledge, information, equipment, energy, materials, analysis and synthesis, as well as the mathematical, physical and social sciences together with the principles and methods of engineering design to specify, predict, and evaluate the results to be obtained from such systems or processes. While industrial engineering is a traditional and longstanding engineering discipline subject to, and eligible for, professional engineering licensing in most jurisdictions, its underlying concepts overlap considerably with certain business-oriented disciplines such as operations management.

Industrial engineering may encompass many disciplines including, but not limited to operations management, management science, operations research, systems engineering, management engineering, manufacturing engineering, ergonomics or human factors engineering and safety engineering. A problem for industrial engineers is for those occurrences when a task is not readily definable, such as defining the specific tasks performed by a supervisor and assigning standard times to those tasks.

The standard time system can be defined and executed by an algorithm, such as a computer executable file, which accesses, uses and manipulates data for the stated purpose. Reference to the standard time system is intended to refer to the entire methodology and structure for implementing the concepts herein, where the standard time system includes at least the algorithm and the data. As also used herein, the standard time system includes means for accessing and utilizing the standard time system. In some embodiments, the means for accessing and utilizing is manifested as a computer application and corresponding GUI enabling a user to access and utilize the standard time system and provide visualization of the process steps, routing and standard times.

The standard time system provides a visualization tool for graphically presenting and manipulating routing definitions and task details, it enables efficient means for calculating standard times with formulas and recursive relationships, and it is seamlessly integrated with external databases and applications such as enterprises resource planning (ERP) applications and advanced planning systems (APS).

A task is a coherent series of actions/activities performed from one or multiple operator(s), one or multiple machine(s) or an operator-machine combination within a station or production line. Tasks may be split down, or sub-divided, to multiple different activities, steps and/or actions depending on the length and complexity of a task. As used herein, a station refers to a physical location on the shop floor, such as a workbench or a workstation or a station in front of a machine, where a series of activities are performed.

By way of a generalized example, the manufacturing of a t-shirt is described. As a manufacturing company, it is necessary to know before actual product manufacturing begins how much labor effort is needed, what the process steps are, what the tasks are, how long each task will take, etc. The customer, entity that is contracting to have the t-shirts manufactured, is asking for costs: cost for material, cost for labor effort.

First the process steps for manufacturing the t-shirt need to be defined. These are called the manufacturing tasks. In the t-shirt example, exemplary manufacturing tasks include, but are not limited to: acquiring the raw fiber, making yarn from the raw fiber, making raw fabric from the yarn, basic processing to get processed fabric, patterning and cutting the processed fabric such as making the sleeves, front portion and a back portion of the t-shirt, aligning the cut pieces together, sewing the aligned pieces together to get a final product, quality checking/inspecting of final product, reworking of final product if necessary, ironing final product, packaging the final product, and shipping the packaged product. The manufacturing tasks are directly connected to the material used for the physical t-shirt, as well as value-added tasks for manufacturing the t-shirt.

In some cases there may be multiple different products, and some of those products may be very similar. For example, one product is a red t-shirt and another product is a blue t-shirt both of the same size (different sizes would be considered different products) and other characteristics, in which case the manufacturing tasks and standard times are the same. If the t-shirt has a printed decal on the front, back or both sides, these are additional process steps that need to be defined. Each subtle tweak to the t-shirt results in different process steps and therefore different standard times from t-shirt to t-shirt.

In general, manufacturing tasks are repetitive, performed specifically for one or many dedicated products. Another example of a manufacturing task is for SMT (surface mount technology) production where a machine assembles components onto a board. Another example is manual assembly, where an operator manually assembles a product. Yet another example is testing, where an operator performs a test on one or multiple products. For manufacturing tasks an industrial engineer typically uses time study techniques or a predefined calculation system (MOST, MTM) to verify the effort per one product. Effort is the time spent in order to manufacture a product or provide a service. A time study is a technique in industrial engineering that determines standard times, such as by observing an activity and using a stop watch to measure the observed time it takes to complete the activity, on average. One cycle may include multiple different products. Cycle time is a target time interval between units coming off a production line and is measured as time per unit. The number of multiple different products needs to be considered for standard time calculation as the standard time is always per product although the recorded cycle time may be per multi-product. Cycle time is sometimes referred to as targeted takt time, or, if using customer demand, this equates to takt time. A significant aspect of cycle time is the bottleneck process within the production line since the bottleneck process has the longest station time and paces the production line. Depending on the design of the process, the bottleneck may be the operator, the machine, or a combination of both. Appropriate allowances need to be factored in. Calculation of cycle time including allowances can be made using the following formula: Cycle Time=((Bottleneck Process Machine Time)*(1+Equipment Allowance)+(Bottleneck Process Manual Time)*(1+PF&D)). PF&D stands for Personal Fatigue and unavoidable Delays, which is considered an allowance for human beings (operators), for example biological brakes, short rest, and the like.

In addition to the manufacturing tasks, there are support tasks that are related to the manufacturing tasks. Support tasks are activities not dedicated for one specific product or are activities that support people or machines who are performing manufacturing tasks. For example, support tasks may need to be defined for warehouse receiving, internal transportation (between manufacturing tasks), supervisor of the line, operator trainers responsible for training the manufacturing task operators, maintenance of manufacturing equipment, etc. The support tasks are particularly difficult to measure. For example, at the warehouse receiving area, raw material for blue t-shirts and red t-shirts may be received simultaneously, or raw material is received that is used for both t-shirts and pants. So there may not be the same level of granularity or one-to-one matching when defining the support tasks as there is for the manufacturing tasks. The method of recording and maintaining the support tasks is also challenging because if anything is changed in the process (support tasks), each product affected needs to be revisited, since each support task may be associated with multiple related product lines, and the corresponding standard times need to be recalculated and propagated through the entire process. For example, there is a manual sewing machine being used to perform a manufacturing task, then the manual sewing machine is changed to an automated sewing machine that no longer uses an operator. In this case, the manufacturing task needs to be reevaluated, every product that uses the new machine needs to be revisited, and the standard time calculation for each needs to be corrected. Additionally, the corresponding support tasks, such as maintenance corresponding to the new machine, affected by this change of machine may need to be corrected, for every product made using that machine as part of the manufacturing process. Support tasks are more difficult to calculate or measure by a regular approach such as a time study because a support task is not repetitive, work content not clearly defined, etc, and usually it is more difficult to allocate the effort to one specific product. In conventional approaches, time studies used to determine support task standard times do not have the same level of precision as those time studies that determine manufacturing task standard times.

Many challenges exist implementing the standard time system. First, the specific manufacturing tasks and support tasks need to be defined. Then, the sequence and routing of the manufacturing tasks need to be defined. The standard times then need to be determined for both manufacturing tasks and support tasks. Both are calculated using formulas, where the formulas provide a linking mechanism between the support tasks and attributes of the manufacturing tasks or attributes of the product being manufactured as described in greater detail below. The standard times are kept up to date. When a task is altered, for example when the equipment used to perform the task is changed or updated, or the process for receiving material is changed, or an organizational change is made, the standard time is to be recalculated for the task and all linked tasks. The standard times are integrated with the rest of the system. Implementing the standard time system leads to improved standard times over time, which results in improved expected performance data. In conventional systems, spreadsheet files, such as Excel® files, are used, one file for each product, and the value for the standard time for each manufacturing task corresponding to the product is stored in the spreadsheet file. One spreadsheet file can have multiple number of records, one record corresponding to each manufacturing task used in the manufacturing of the product. For a change, such as the change in sewing machine type described above, the conventional system would require opening each related spreadsheet file, which may be in the thousands for a large manufacturing facility that makes many products, and changing the parameters/parameter values there, saving the new entries, and uploading the updated files to the ERP system. In such conventional systems, if a manufacturing task change is made to an existing process structure, recalculations are not made because it is too burdensome to individually change each of the large number of related records affected. Typically only when a large change is made is the entire structure updated by independently updating each manufacturing task standard time and every related record. For support tasks, updating records and their accuracy is highly questionable because each support task is tracked across all spreadsheets in conventional systems. The standard time system introduces a higher degree of record keeping granularity by recording and maintaining standard times for manufactured items, and introduces formulas that enable automation which leads to easier updating of records. The standard time system also utilizes a linking matrix between related tasks, as described in detail below.

To understand the potential burden of updating task records, take the following example. In an exemplary manufacturing facility (site) there is an average of 5,000 manufactured items per site. Each product (item) has an average of 10 manufacturing tasks, and each manufacturing task has an average of 5 steps. This results in an average of 50 steps per product (10 manufacturing tasks*5 steps), which results in 250,000 steps per site (50 steps per product*5,000 products per site). Each product has an average of 10 support tasks, which results in 50,000 support tasks per site (10 support tasks per product*5,000 products). Each manufacturing task/step and each support task has a record associated with it, which results in 300,000 records per site. For a company that has multiple manufacturing sites, for example 60 sites worldwide, the number of records for the company is 18,000,000. If an influence variable/factor of one single support task changes, this results in a change to 5000 records per site, or 300,000 records company wide. Larger record changes may be seen if a single manufacturing task is changed, where that manufacturing task is utilized across multiple product lines.

Such issues are addressed by the standard time system. Complexity is managed: routing paths, routing families, and alternative routes are defined, all in a visual format. Data quality is maintained: the standard time is the basis for any resource planning activity for man and machine. Also, utilization and efficiency performance indicators rely on a good data quality of the standard time. Global parameters are maintained: global parameters like allowance or site-specific factors or calculation parameters may change over time; any change typically effects a high number of records in the standard time system. Calculation details and formulas: calculation details and formulas for tasks are kept in a data repository. In this manner, for any change in the product or process the details may be re-visited in order to find out if the change is impacting the standard time. Changes are managed: any change of the product, process or layout and nature of the line or equipment may have an impact on the standard time or a parameter or factor of the product.

The standard time system is now described in relation to an overall planning process. FIG. 1 illustrates a conceptual block diagram of a planning process that includes the standard time system. A first layer, labeled Industrial Engineering, includes industry standards such as the manufacturing task standard times and industrial engineering principles previously described. Industrial engineering is the basis for any planning activity since the routing information, such as cycle time, work area and work center, is defined by industrial engineering. A work area is an organizational unit, usually also connected to one or multiple work centers. A work center is a physical location, usually maintained in an ERP system, and can have sub-work centers. One work area can utilize multiple work centers. One work center can also be utilized from multiple work areas. Functions performed at the first layer include, but are not limited to, ensuring implementation of sufficient industrial engineering standards.

A second layer, labeled standard time system, is the standard time system described herein. The standard time system defines standards and definitions and correlates these standards and definitions to specific industry standards from the first layer. Functions performed at the second layer include, but are not limited to, defining a routing for every single product, defining physical structure such as work centers, stations and machines, generating standard time per manufacturing task and support task, keeping track of calculation method and details, keeping track of changes, calculating and maintaining calculation parameters, and implementing any change on product, process, environment or any other change that may impact the cycle time or man occupation of the manufacturing process. Cycle time is a target time interval between units coming off a production line. Man occupation is a number of people/operators involved in a task. For example, the second layer defines, records and manages process steps and standard times calculations for specific products to be manufactured. The second layer also defines allowances, which refers to an uplift that goes on top of the standard time for "allowed" extra time needed for operators and for machinery. In the case of operators, allowance is the adjustment done to the normal time to obtain the standard time for the purpose to recover the lost time due to personal needs, fatigue, and unavoidable delays. By providing a small increase to the normal time in each cycle, the worker can still be able to cover lost time and complete the work assigned to him. In the case of machinery, allowance is the adjustment for unavoidable delays and losses due to the nature of a machine. Collection of a representative set of data and a solid analysis is needed in order to calculate the percentage that has to be added to the optimal machinery time. The second layer can also define levels of granularity related to work area and operations structure such as stations, tasks, direct labor planning definitions and definitions of time and performance management.

A third layer, labeled ERP Routing, receives the routing information from the second layer. ERP is an application/software to manage resources. ERP routing basically defines each product by its associated tasks, as well as the throughput time and labor effort. The fourth layer, labeled Planning & Scheduling, receives demand data from the ERP routing to enable enterprise planning and scheduling functionality. Examples of such planning and scheduling functionality is found in the co-pending U.S. patent application Ser. No. 15/135,30, filed Apr. 21, 2016, and entitled "Workforce Design: Direct and Indirect Labor Planning and Utilization", which is hereby incorporated in its entirety by reference.

A forth layer, labeled Demand Management & Simulation, provides various management reports and forecasts based on the data provided by the underlying layers.

Figure 2:
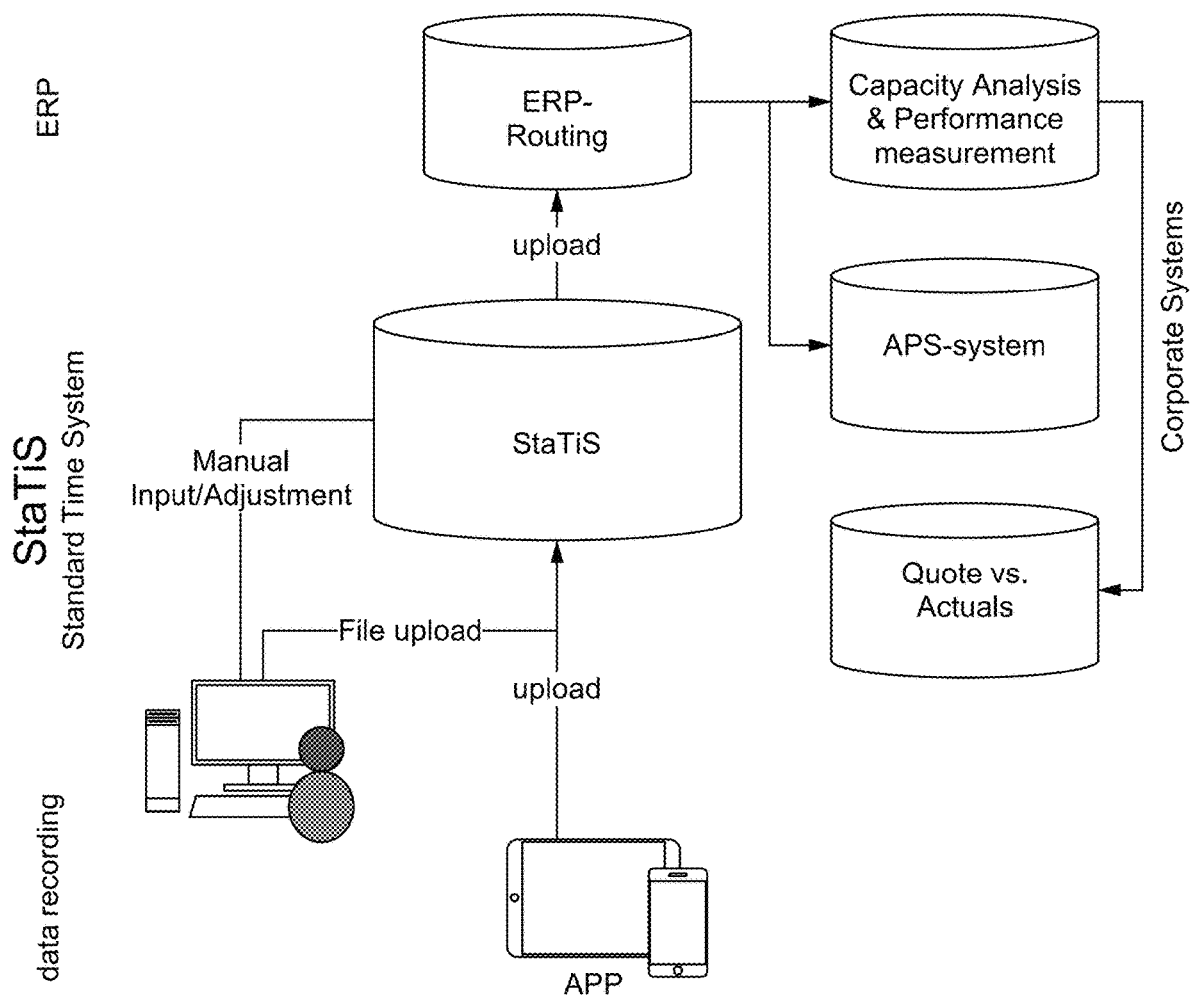
FIG. 2 illustrates the exemplary integration of the standard time system within an enterprise application.

FIG. 2 illustrates the exemplary integration of the standard time system within an enterprise application. At the data recording layer, different input methodologies are visualized, such as a mobile application, a desktop computer application or a structured file upload. The standard time system, labeled as StaTiS, is the central host system for receiving the data recording information and for providing so called "routing-data" to the ERP system. On-going data maintenance and recording is performed by the standard time system. Out of the ERP system several other corporate planning and analysis tools can be fed, such as capacity analysis and performance measurement tools, APS-system, and quote vs. actual analysis tool. The standard time system is designed to integrate with the ERP system in a smart, efficient and seamless manner. Conventional applications that use spreadsheet file type systems for recording and maintaining records do not efficiently and seamlessly integrate with the ERP system. The ERP system basically defines each product by its associated tasks, as well as the throughput time and labor effort. Throughput time is the total time required to manufacture a product or service, also known as production lead time, measured from start till end of the manufacturing process.

Figure 3:
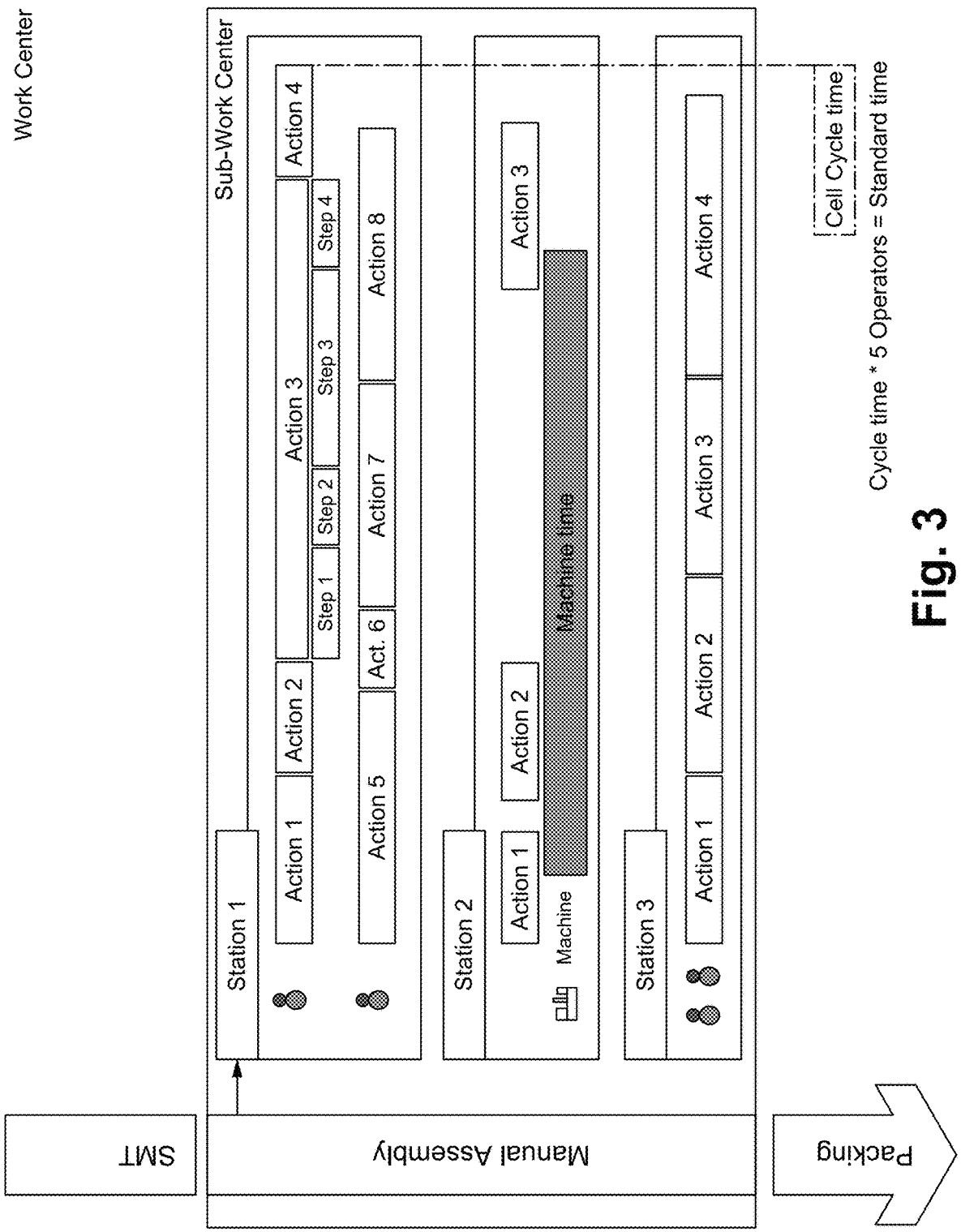
FIG. 3 illustrates an exemplary process flow with the routing and sequence of tasks.

The standard time system provides a visual means, using a visualization tool, for recording, organizing and presenting process steps. FIG. 3 illustrates an exemplary process flow with the routing and sequence of tasks. The routing is shown on the left hand side and refers to the sequential path of the product being manufactured from work center to work center. In the exemplary portion shown in FIG. 3, the portion of the routing shows a SMT work center, followed by a manual assembly work center, followed by a packing work center. The detailed process steps shown correspond to the manual assembly work center. The manual assembly tasks correspond to manufacturing tasks. The details of the manual assembly tasks are divided into stations, actions and steps. The visual representation also shows how many operators or machines are associated with each station.

For each work center, one or more stations are defined, for example station 1, station 2, station 3 shown in FIG. 3. Actions and/or steps are defined for each station. As used herein, there is no distinction between an "action" and a "step". As previously described, a task can be divided into any level of granularity. In the example shown in FIG. 3, an action is sub-divided into steps, where "step" is used to show a greater degree of granularity than "action". Each can be considered a manufacturing task. For example, station 1, action 3 may represent sewing. It is decided to further break-down the sewing action into more refined steps. Step 1 may be grabbing the fabric to be sewn, step 2 may be placing the grabbed fabric onto the sewing machine, step 3 may be pushing the start button on the sewing machine, sewing and pushing the stop button on the sewing machine, step 4 may be removing the sewn fabric from the sewing machine. The structure has a "recursive relationship" meaning that each action, step, sub-step, etc. can be sub-divided as broadly or minutely as needed. Sequential or parallel tasks can be defined. For example, action 1, action 2, action 3, action 4 are sequential steps, and action 5, action 6, action 7, action 8 are also sequential steps, whereas actions 1-4 and actions 5-8 are parallel steps.

The visual length of each action or step shown in the graphic is a function of the time spent performing that action. This provides a quick and efficient overview of time spent, and provide incite as to where improvements can be directed, e.g. which actions need to have their times improved (reduced). This graphic also provides an overview of the relationship between process steps, for example what process steps precede and follow a given process step. All the data is visually/graphically represented using the visualization tool. The graphic also shows the cycle time, which is the longest path within the work center. Each manufacturing task is defined by a formula, which may include variables that define standard time values as provided by industrial engineering practices, as well as weighting factors and allowances defined for localized conditions. Allowances account for human needs such as break-time, restroom break, private phone call, called away by a supervisor, or the like. There are predefined factor values, for example between 8-15%, for allowance, which is the time allowed for the operator to be away from the line. The allowance can be different based on the task, action or step. For example, if the operator performs the task of handling a heavy part, a greater allowance factor is defined. If a task has built in down times between sequential steps, the allowance may be lower.

As seen from the visual representation, each manufacturing task impacts other manufacturing tasks. This inter-relationship can be simple or complex. For example, sewing two pieces of fabric together is first dependent on cutting fabric to form the two individual pieces. In such a serial relationship, a link in the chain so to speak, a change to one manufacturing task effects other manufacturing tasks in the series. More complex inter-relationships have more widespread consequences when a single manufacturing task is changed. For example, a change in a manufacturing task in a first work center may result in a delay to receiving material in only one station of a second work center. The other stations in the second work center may not be directly affected since these other stations do not receive the material from the first work center, but the other stations may be indirectly delayed due to the direct delay impacting station one if the other stations are dependent on the output of station one. The standard time system accounts for such inter-relationships be appropriately linking all tasks, actions and steps in the process, to form an interconnected matrix of links. When the standard time for a specific task is changed, this change is propagated through the process by the linking matrix. Other types of links described below are also part of the linking matrix.

For example, an operator 1 in station 1 handles material and is linked to an operator 2 in station 2 that is supplied the material. A factor links the step performed by operator 1 to the step performed by operator 2. In some configurations an operator at one station may be under-utilized if linked to only one operator at another station, so this operator is linked to multiple other operators. For example, the operator 1 that supplies materials is linked to multiple operators that are to be supplied materials. Say the material handling operator is to supply three other operators with supplies. The factor associated to the material handling operator is 0.33. To apply this factor, the standard time of the time for transportation between station 1 (where material handling operator is located) to station 2 (the station that is supplied material by the material handling operator) is multiplied by 0.33 to determine the standard time for material transportation between two such stations. This is one calculation formula. All the tasks, all the calculations, all the formulas are linked together in this manner.

Over the lifetime of the product, there may be many production changes implemented which affect tasks, steps and standard times. The formulas for each task and step, and the interlinking of all tasks provides a means for propagating any change through the entire manufacturing line, as well as the entire manufacturing site for those changes linked to multiple manufacturing lines.

Stations are physical locations within a production line, such as a table or a machine, and can be a work area. An action or step not only defines what task an operator is performing at the station, but also how long it takes to perform the task. The length of time to perform the action or step is denoted by the length of the action or step box. The visual representation shown in FIG. 3 shows the physical location (station #), the task(s) to be performed at each location (action #, step #) and the time to perform each task (the length of the action/step box). These are the building blocks for defining the overall production line (routing path) for manufacturing a product.

At some stations, multiple actions may occur simultaneously, which is visually represented. For example, action 1 and action 5 are occurring together in station 1. There may be idle time between sequential actions at a given station, meaning there is no continuous action performed by the operator. For example, there is "idle time" between action 2 and action 3 at station 2, represented as a gap (shown) or a box labeled "idle time" (not shown). At station 2 there is a machine. Action 1 may be an action for loading a material into the machine and starting the machine, action 2 may be preparing a next piece of material to be loaded when the current material is finished in the machine, and action 3 may be stopping the machine and unloading the material from the machine.

Stations may visual show that they are performing tasks concurrently, but there still may be an interdependency between the two. By way of a simple example, say a similar manual assembly block shown in FIG. 3 is alternatively used for sewing a t-shirt. Station 1, top operator may be for getting a front piece of material, getting a back piece of material, and two sleeves and aligning the pieces together. Station 1, bottom operator may be for checking that the pieces are aligned properly. The aligned pieces completed at station 1, bottom operator are transported to station 2. In this example, the number of actions and steps is not exactly that as shown in FIG. 3. Station 2 includes the actual sewing machine. Action 1 is to place the received aligned pieces into the machine, and action 3 is for removing the sewn together pieces. The sewn together pieces are then transported to Station 3. Station 3, action 1 may be for folding the t-shirt, action 2 may be for packing the folded t-shirt. In this example, a single station is shown for the specified actions/steps. It is understood that there can be multiple of the same station, for example multiple sewing machines and therefore multiple station 2's, or there may be two stations preceding station 1 that each manufacture sleeves since two sleeves are needed for each t-shirt.

Standard times for support tasks are also calculated by using formulas. Each formula is either using a product attribute or an attribute of one or more specified manufacturing tasks as a basis, multiplied by a pre-calculated, global or site specific variable. The specific variable value is referred to as a factor. Multiple different formulas may include one or more of the same variables and/or factors. As such, the different formulas are linked through any common variables. If an administrator changes the factor of a global or site specific variable then all related support task standard times are changed at the same time due to linking of the formulas. If a standard time of a manufacturing task is changed and a support task is linked to that cycle time, all related support task standard times are concurrently changed due to the variable linking in the formulas. Further, support task formulas that include one or more manufacturing task standard times as variables are automatically recalculated when one or more of the associated manufacturing task standard times are changed. In this manner, the manufacturing tasks and their corresponding standard times are linked to the support tasks and their corresponding standard times.

A driver for the effort calculation of a support task is defined by product attributes or manufacturing task attributes. An exemplary product attribute is a number of components used on one product, which may be the basis to calculate offline-setup effort. Another exemplary product attribute is product complexity, which may be the basis for process-technician support effort, e.g. if complexity high, then effort is higher as well. Such an attribute is assigned a corresponding value and stored in the standard time system. An example related to a manufacturing task attribute is the time spent for a supervisor, which is driven by the number of operators at the line being supervised. Another example related to the standard time of a manufacturing task is the time spent for a warehouse operator, which is driven by the amount of materials used on the shop floor. In general, support tasks have either a manually generated standard time calculation value, a pre-defined formula based on parameters and values having an optional off set, or a modified formula based on parameters and values having an optional off set.

For example, consider a Material Water Spider used in SMT lines. A Material Water Spider is an operator tasked with supplying material directly to a station or machine. By definition, supplying raw material to a station or machine is considered as a support task activity. Direct interaction with the product or service is considered a manufacturing task. In this example the machine assembling material on the board is considered as a manufacturing task, but the material water spider supplying material to the machine is a support task. The formula used to calculate the standard time for this support task is: (# of SMT placement position)*(material handling factor for SMT-lines). The # of SMT placement position is a parameter (product attribute), e.g. 300 components. The material handling factor SMT lines is a pre-defined factor, e.g. 0.4 seconds/component. The support task standard time is 300*0.4=120 seconds. Calculation variables/factors may be local (relevant for only one site) or global (relevant for all sites). If a factor for a specific variable is changed in the database, then all calculation values in the system based on formulas including the specific variable are changed as well. Support tasks are linked to manufacturing tasks using the linking matrix. FIG. 4 illustrates an exemplary linking matrix between three support tasks and three manufacturing tasks. Support task 150 uses task 710 plus task 900 as a basis for calculation. In a real scenario task 710 and task 900 are manufacturing tasks and the standard times of these manufacturing tasks are used as a basis in order to calculate the effort for support task 150. For example, 10% of the operator time in task 710 and 900 are calculated for a supervisor, which is support task 150. If the same support task exists more than one time in the linking matrix, then multiple records are generated. Tasks are automatically assigned an operation number in the system. The operation number is part of a numbering system used to define the sequence of tasks. In some embodiments, this operation number is lower than a parent operation number in order to ensure completion in the right sequence.

As previously described, a routing or routing path is the definition of the route of a product through its manufacturing process. Operation numbers such as those shown associated with the tasks shown in FIG. 4, define the sequence of tasks performed on the product. The "standard routing", also referred to as "default routing", is the optimal or preferred path of the product through the manufacturing process. The "alternative routing(s)" is an alternative path the product can take because of capacity limitation on the default path. Alternative routing also provides an increase of flexibility and a reduction of production lead time.

Figure 5:
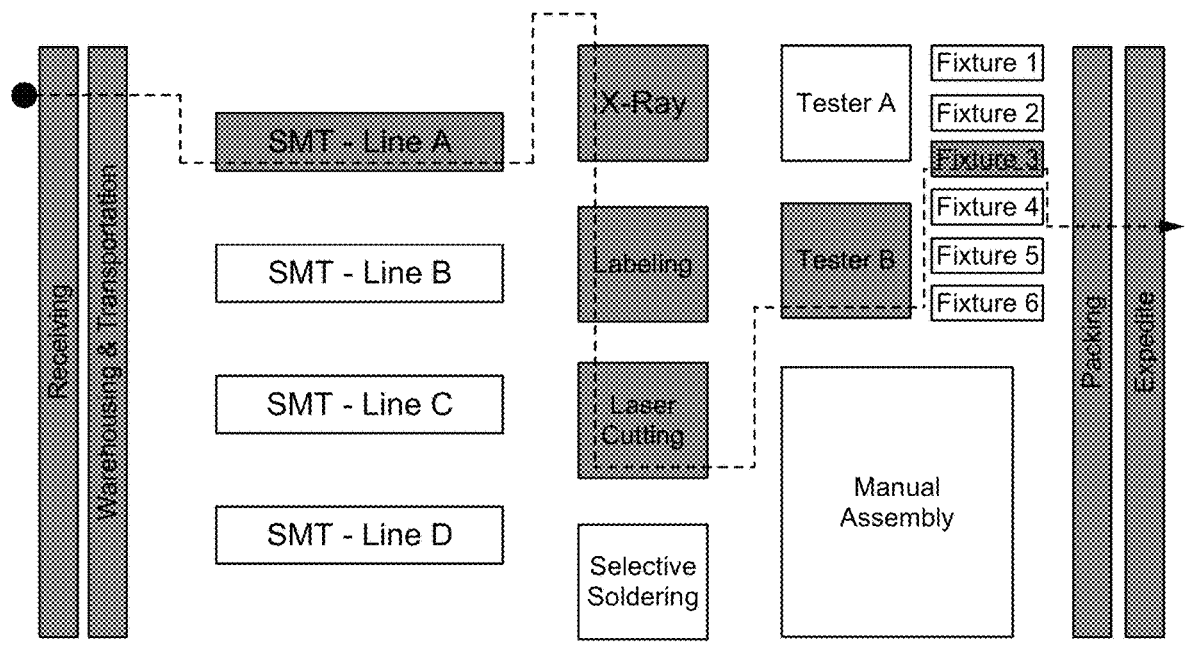
FIG. 5 illustrates an exemplary standard routing of a product in a PCBA (printed circuit board assembly) factory.

Based on manufacturing strategy the standard routing may be the fastest, cheapest, easiest or highest predictable quality path of the product through the manufacturing tasks. FIG. 5 illustrates an exemplary standard routing of a product in a PCBA (printed circuit board assembly) factory. FIG. 5 shows a sample shop floor with some of the work centers and related tasks. It is understood that the concepts can be applied to other types of products in other types of manufacturing facilities. The dashed line visualizes the standard routing of a specific product through that shop floor. The graphic also visualizes a combination of machines that are used in the standard routing, such as the Tester-B with Fixture-3.

If there is more than one defined route for a product, such as the use of different lines/machines/cells/etc., an alternative routing can be generated in the system. An alternative routing is an alternative path for a product through the tasks and work centers of a manufacturing plant. Alternative routings may get different priorities based on pre-defined factors. Potentially every single task can have one or multiple alternatives. Any alternative may have additional conditions. For example, an alternative may have a different process time or man occupation.

Figure 6:
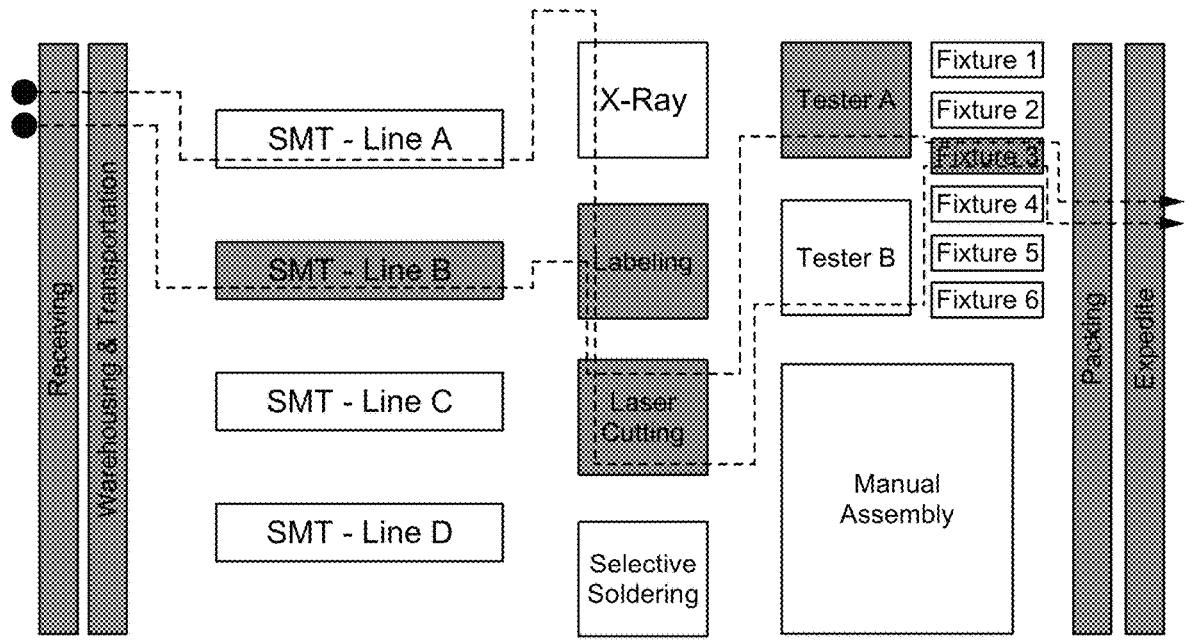
FIG. 6 illustrates the exemplary PCBA factory of FIG. 5 with an exemplary alternative routing of a product.

FIG. 6 illustrates the exemplary PCBA factory of FIG. 5 with an exemplary alternative routing of a product. In addition to the standard routing, top most dashed line, FIG. 6 shows an alternative routing. In this case the bottom most dashed line indicates the alternative routing. The differences in the two routes are that X-ray is not used in the alternative routing, and Tester A is used instead of Tester B. In the alternative routing, Tester A is used in combination with Fixture 3. Having alternative routing provides flexibility and redundancy in case of increased work load, back log, equipment down time or other conditions that influence the product flow. It is understood that alternative routes can use the same or different types of machines. The visualization tool provides a means for defining and organizing the specific manufacturing tasks and stations of each routing, as well as a comprehensive overview showing each individual routing or all routings for comparison.

Alternative routing can become highly complex as the number of variants are grows exponentially by every single task that is performed on an alternative work center. Many combinations are possible and any change in the path results in an additional alternative. FIG. 7 illustrates a simplified example of a standard routing and some possible alternative routings. The standard routing is task 1, task 2, task 3, task 4. Alternative option 1 shows an alternative routing where an alternative to task 2 is provided as task 2A. For example, task 2A uses the exact same type of sewing machine as task 2. Alternative option 2 shows the alternative routing having two different tasks, task 2A and task 3A, being performed in place of task 2 and task 3. If this alternative routing is selected, then both alternative tasks 2A and 3A are performed. For example, maybe task 2A uses a different type of sewing machine, so a different quality inspection must be performed. Alternative option 3 shows the alternative routing having two different tasks, task 2A and task 3A, being performed in place of task 2 and task 3 (similar to alternative option 2). However, in this case, there is the option of returning to the standard routing after performing alternative task 2A. Alternative option 4 shows the alternative routing where an alternative to task 2 is provided. However, in contrast to the alternative option 2 where a single task 2A is performed instead of the task 2, two alternative tasks 2A and 2B are performed instead of task 2. Alternative option 5 shows an alternative routing which if taken is maintained until the end of the manufacturing process for the product. This contrasts with the other alternative options 1-4 where the alternative routing is taken for one or more process steps and then the routing returns to the standard routing. These are just a small sample of the possible alternative routings that can be implemented. It is understood that any number of alternative routings can be implemented for any given process step or steps within the overall routing path.

In general, the standard time system is used to define an organizational structure for a given project, such as manufacturing a product. The organizational structure defines the procedural steps and the actions and tasks and times associated with performing the entire project. Within this structure can be any number of potential routing paths that can be taken to manufacture the product. For the standard routing and all of the defined routing alternatives, each path has its own composite calculated standard time for performing each potential route. In the standard time system all routes and tasks are predefined so as to guarantee that all resources (machines, operators, stations) are adequate and qualified to performed the intended tasks. The given route at any moment in time may adjust due to operational conditions, such as capacity issues, requests and equipment maintenance. The standard time system enables setting of this structural foundation for defining process tasks, actions, steps, routes and standard times (both for manufacturing tasks and support tasks) for all defined routing paths. In some embodiments, the alternative routings each meet the same quality guidelines as the standard routing. The qualifications are determined based on the machine capabilities, the operator capabilities, staff capabilities, etc.

The more alternatives that can be defined, the greater the manufacturing flexibility and the better the overall efficiency. In most applications, not just a single product is being manufactured, but instead many products, maybe a few hundred products are more, are being manufactured in parallel, and many of the machines and stations using the same resources and operators, are being used for multiple different products. The standard time system enables efficiency for manufacturing the combination of products at the same site. Because on one day, a lot of product 1 may be manufactured, but on the next day there may be a need for more of product 2 to be manufactured.

In contrast, there is one planned standard route and maybe one alternative route planned for in conventional planning methodologies because it is too complex to manipulate all the variables (tasks, actions, steps, stations), and it is too complex to manage later on when particular variables change which change the calculations. Such changes are made on the fly with concern for localized impact, without being able to propagate the affects of such changes throughout the entire manufacturing process.

Routing families are a group of manufactured items that have equal or similar routing attributes, for example the same or similar cycle time, work center, task-sequence, etc. Routing families are used in order to reduce the number of routing records and to group similar products together. FIG. 8 illustrates exemplary routing families as applied to an exemplary product family. The product family A is a single product group that has four very similar, but separate products A.1, A.2, A.3, A.4. As an example, each different product can be a different color or language version of a product. Assembly time of those products are usually very similar or absolutely the same. That is why it makes sense to group substantially the same products together in routing families. Only if cycle times are very different is this not possible. Here in this example products A.1, A.3 and A.4 have the same process times (cycle times), but product A.2 has a different cycle time due to the increased standard time for task 2. The difference is large enough that product A.2 cannot be part of routing family "Ax" but needs to be part of a new routing family "Ay". For example, the product family A is t-shirts. Product A.1 is a blue ti-shirt, product A.3 is a red t-shirt, product A.4 is a black t-shirt. They each have the same tasks and cycle times. However, product A.2 is a red t-shirt with a pocket on the front. So task 2, the sewing, takes longer to perform. Product A.2 is still a t-shirt and is part of the product family A, but product A.2 is a different routing family.

Figure 9:
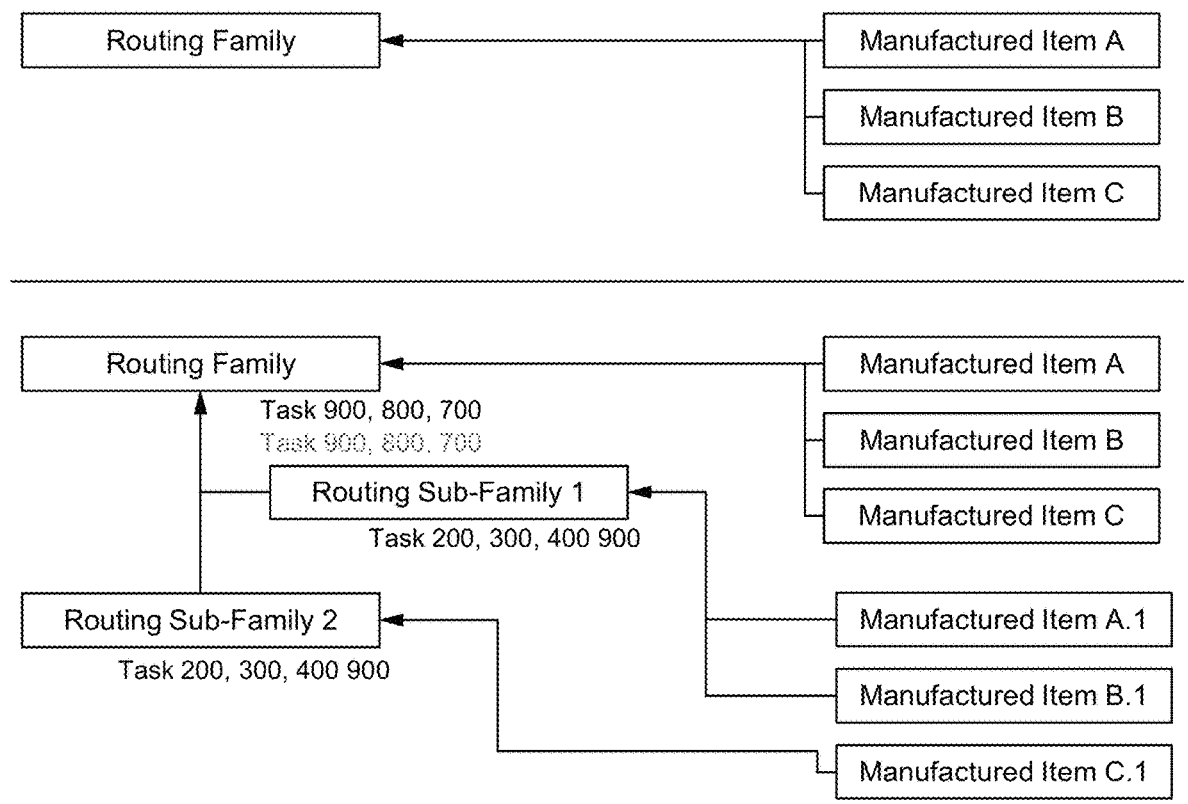
FIG. 9 illustrates various relationships manufacturing items can have to routing families.

One manufactured product, also referred to as a manufactured item, can belong to only one routing family. One routing family can contain multiple manufactured items. FIG. 9 illustrates various relationships manufacturing items can have to routing families. In the upper section of FIG. 9, the manufactured item relationship to routing family is a very simple one. Multiple manufactured items belong to only one routing family. For example, manufactured item A can only be mapped to one routing family.

In the bottom section of FIG. 9, a more complex relationship is visualized. Here, a BOM (bill of material) structure versus a routing family structure may be different and semi-finished good items can be grouped differently like the top-level BOM structure. The BOM structure is the material list in the ERP system that defines the materials that go into a manufactured product. Raw material is usually purchased parts. Depending on the complexity and nature of a product, semi-finished good may be produced in different manufacturing steps, such as that shown in relation to routing sub-family 1 and routing sub-family 2. Those semi-finished good may be used in various different finished products and also the usage of that item may defer between the parent-product.

Figure 10:
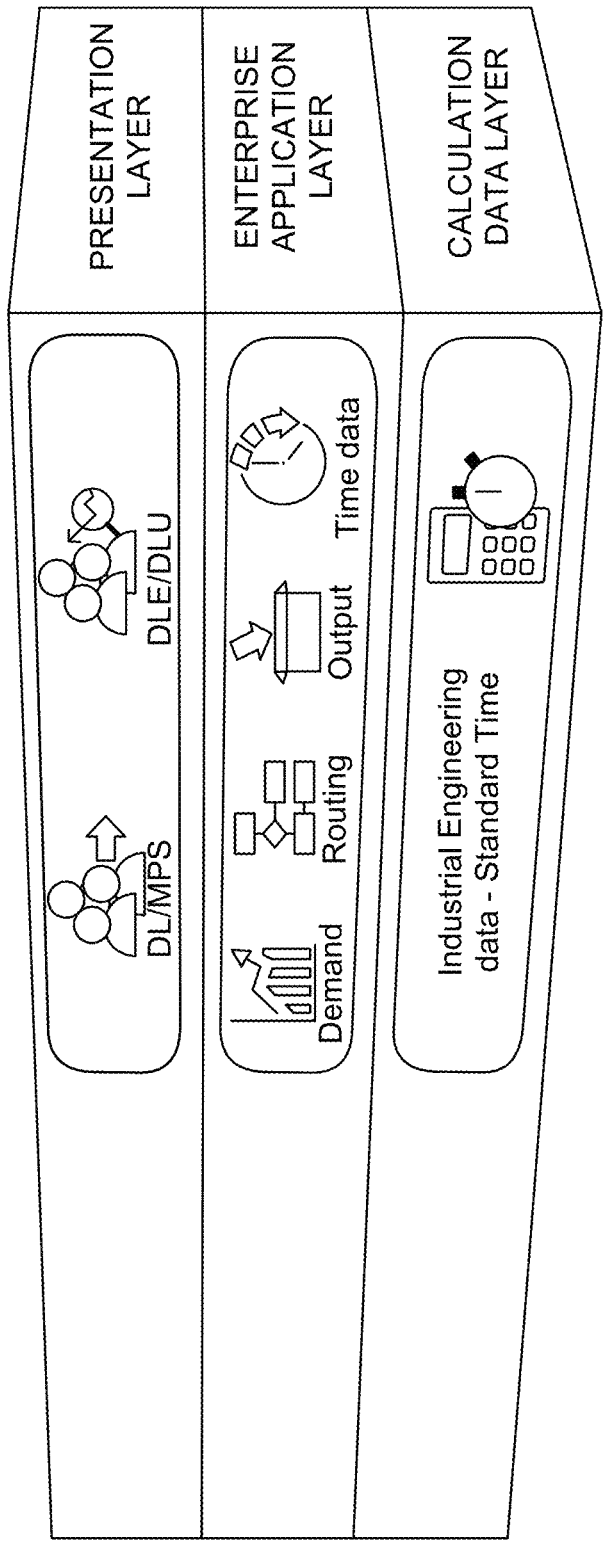
FIG. 10 illustrates an exemplary enterprise architecture into which the standard time system is integrated.

The standard time system is a system that enables recording of standard times data by products or product families. The standard time system also enables the industrial engineer to calculate and add extra tasks, such as support tasks, based on existing standard time or product specific parameters. Aggregated data out of the standard time system, such standard time attributes per task and operation sequence, are input into the ERP system as the so called "routing operations". The standard time system is located at the calculation data layer. The standard time system is designed to be the data repository for all the detailed standard time and routing data. Aggregated information per task is transferred to the enterprise application layer in order to support routing functionality in the ERP system. FIG. 10 illustrates an exemplary enterprise architecture into which the standard time system is integrated. The enterprise architecture includes a calculation data layer, an enterprise application layer and a presentation layer. The layers represent the data concept and architecture of the system, for example a general model with sample applications. Any data generated is hosted in the calculation data layer, the level of granularity and details are defined here. Data from the calculation data layer is aggregated and pushed to the routing section, which is the enterprise application layer. The enterprise application layer also includes all other required enterprise applications, such as the ERP system and the Time&Attendance system. Finally, all the needed data is combined and visualized in the presentation layer, which makes it possible to present the information to the responsible people. DL-MPS (Direct Labor Master Production Schedule) provides operation forecasts. DLE/DLU (Direct Labor Efficiency/Direct Labor Utilization) is a measurement system to measure performance according to the actual output.

Figure 11:
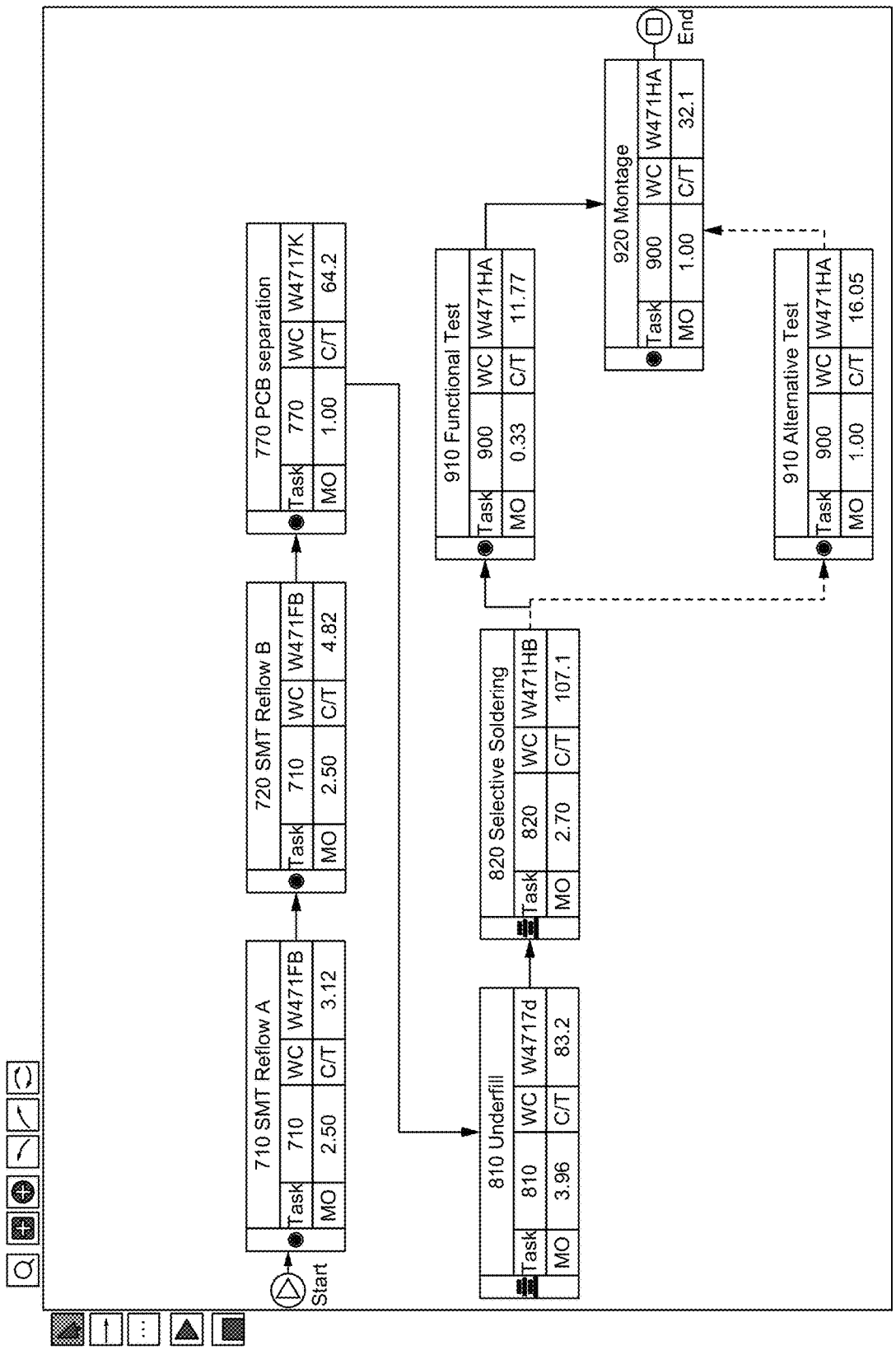
FIG. 11 illustrates a GUI routing tool for defining an exemplary standard routing of the product as well as exemplary alternative routing.

The standard time system includes many graphical user interface (GUI) tools, collectively part of the visualization tool. The visualization tool provides a graphical means for accessing and implementing the functionality of the standard time system. It is understood that the set-up, look and feel of the following GUI tools, forms, etc. are intended as exemplary graphical means corresponding to the visualization tool, and that alternatively configured GUI tools, forms, etc. are also contemplated to implement the functionality for the standard time system. FIG. 11 illustrates a GUI routing tool for defining an exemplary standard routing of the product as well as exemplary alternative routing. The GUI routing tool makes it very visual and easy for the user to setup the flow and arrange tasks in a graphical/logical structure. Most important attributes of a task can be seen in its corresponding box. The solid line with the arrows shows the standard routing of the product. The dashed line shows an alternative routing of the product. A start and end point are set in order to define the flow. Boxes 2, 4, 6, 8, 10, 12 represent tasks for which the information has been manually entered by the user using a Quick-Create-Task form (see FIG. 12). Boxes 14, 16 are created with a "Create Task details" form (FIG. 13) and contain more details. Cycle time is not manually entered as a value but calculated out of detailed records. The visualization tool presents color graphics and as such the boxes for manually entered data, such as boxes 2, 4, 6, 8, 10, 12, can be color coded, such as blue boxes, and the boxes created with the "Create Task details" form, such as boxes 14, 16, can be differently color coded, such as purple boxes.

FIG. 12 illustrates the Quick-Create-Task form populated with exemplary data. The Quick-Create-Task form is designed to quickly enter or change information of an operation step. All the relevant information can be directly entered here. Certain fields can be highlighted as mandatory field for ERP routing. Example of such mandatory fields in FIG. 12 are the Task Code field, the Operation Code field, the Work Center field, the Machines field, the Setup Time per Prod Order field, Man Occupation field, the Gross C/T for Production (min.) field, the Re-processing Rate field, and the Transfer lot QTY field. Other fields can be highlighted as mandatory fields and must be filled with valid data prior to saving and closing the form. Examples of such fields in FIG. 12 are the Task Code field, the Operation Code field, the Work Center field, the C/T (cycle time) for Production field, the Man Occupation field, and both of the Allowance fields. Certain other fields are calculated fields, no information can be entered but the populated information is calculated based on other fields of the form. Example of such calculated fields in FIG. 12 are the Net C/T for Production field, the Gross C/T for Production fields (sec. and min.), the Production rate field, the Planning UPH field, and the Transfer lot QTY field. Still other field are optional fields and may be filled with data. Examples of such optional fields in FIG. 12 are the Machine Occupation field, the Units per Cycle field and the Efficiency % for Planning field. The Machine Occupation filed is a conditionally mandatory field, where if the Machine field is selected, then the Machine Occupation field becomes mandatory.

Figure 13:
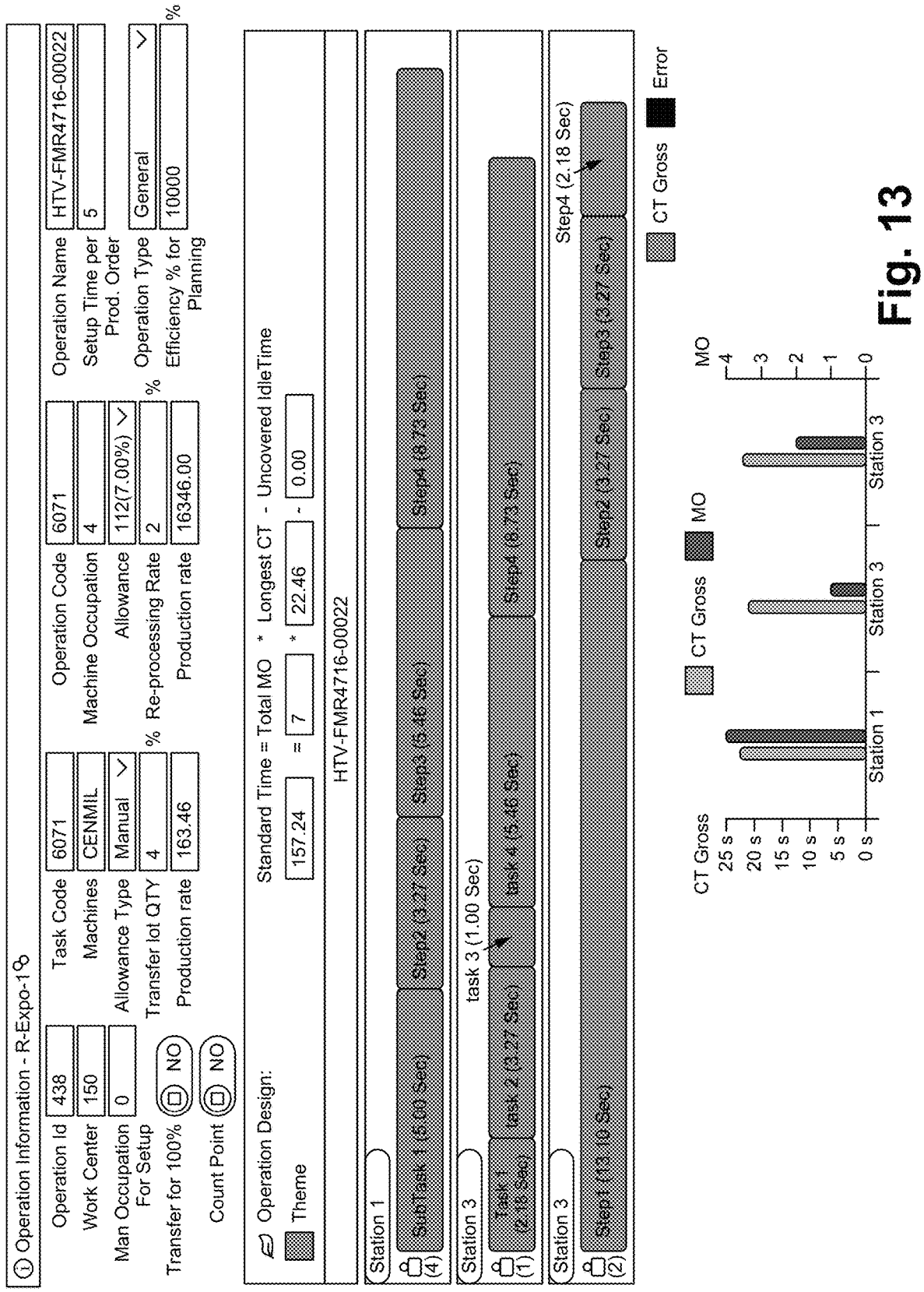
FIG. 13 illustrates the Create Task detail form populated with exemplary data.

FIG. 13 illustrates the Create Task details form populated with exemplary data. The Create Task details form enables the user to set up a task with details on the next granularity level. For example, a manual assembly task can be split down into steps or actions or even single movements. FIG. 13 shows an assembly line with 3 stations (Station 1-Station 3). Within each station there are individual sub-tasks visualized by using the darkened bars. The boxes can be differently colored to indicate different status, for example normal status in purple and error status in red. The lengths of each individual single bar represents the calculated standard time. Underneath the task-details there is a line-balance chart that visualizes the balance between the different stations as well as the man occupation per station. By using drag & drop functionality the bars can be moved to another station or rearranged within the station. This graphical interface makes it very convenient and visual for the user to design the line and level the load between the operators or stations.

Figure 14:
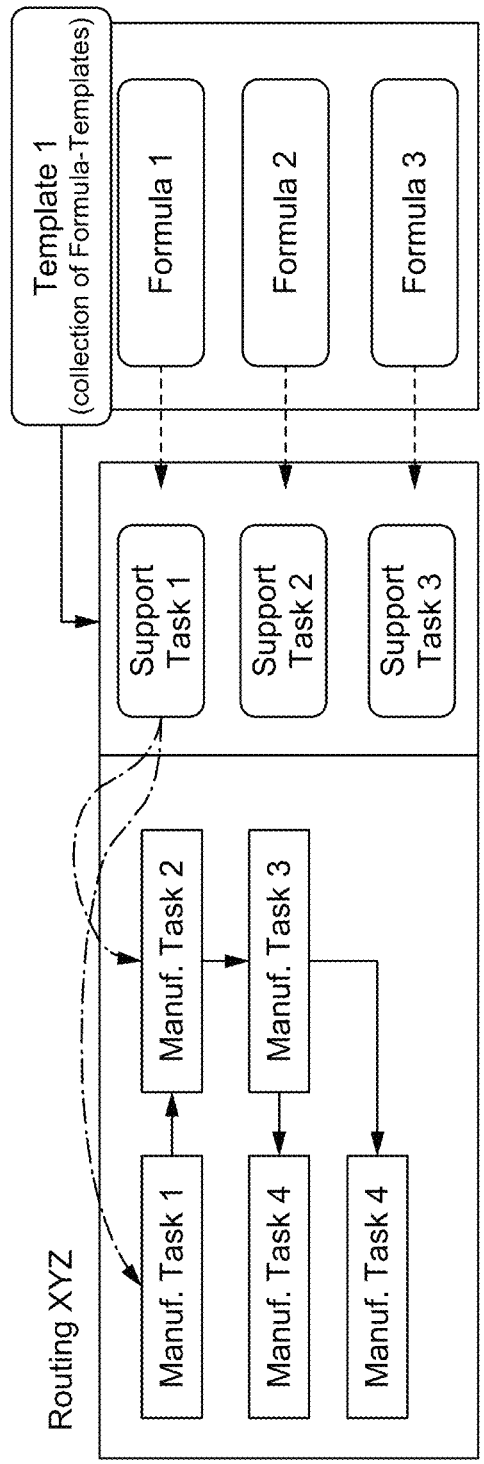
FIG. 14 illustrates an example of how a template is assigned to support tasks of a routing.

Support tasks are based on calculation formulas as previously described. Calculation methods can be defined and agreed upon on a periodic basis, such as once a year. The calculation methods are usually applicable for all the products in the system or at least for a wide range of products. As such, the calculation formulas can be grouped together into a so called "template" and then the template gets assigned to one, many or all of the routings. FIG. 14 illustrates an example of how a template is assigned to support tasks of a routing. In this example "Template 1" includes a set of calculation formulas, "Formula 1", "Formula 2" and "Formula 3", which are assigned to a particular routing. Support tasks may be assigned to attributes of a manufacturing task, for example "Support Task 1" is assigned to the cycle time/standard time of "Manufacturing Task 1" and "Manufacturing Task 2". Alternatively, support tasks may be assigned to product specific attributes, such as product complexity or the number components per product. Each formula includes the corresponding assigned attributes, each multiplied by a corresponding system-global variable (factor). For example, the support task standard time for a production supervisor can be calculated as a percentage of number of operators. Say one production supervisor is required for 50 operators, and a production supervisor effort is 2% (this is the factor). Using the calculated standard time of each of the manufacturing tasks of each operator under supervision (parameter) and multiplying by 2% results in the support task effort for the production supervisor.

Figure 15:
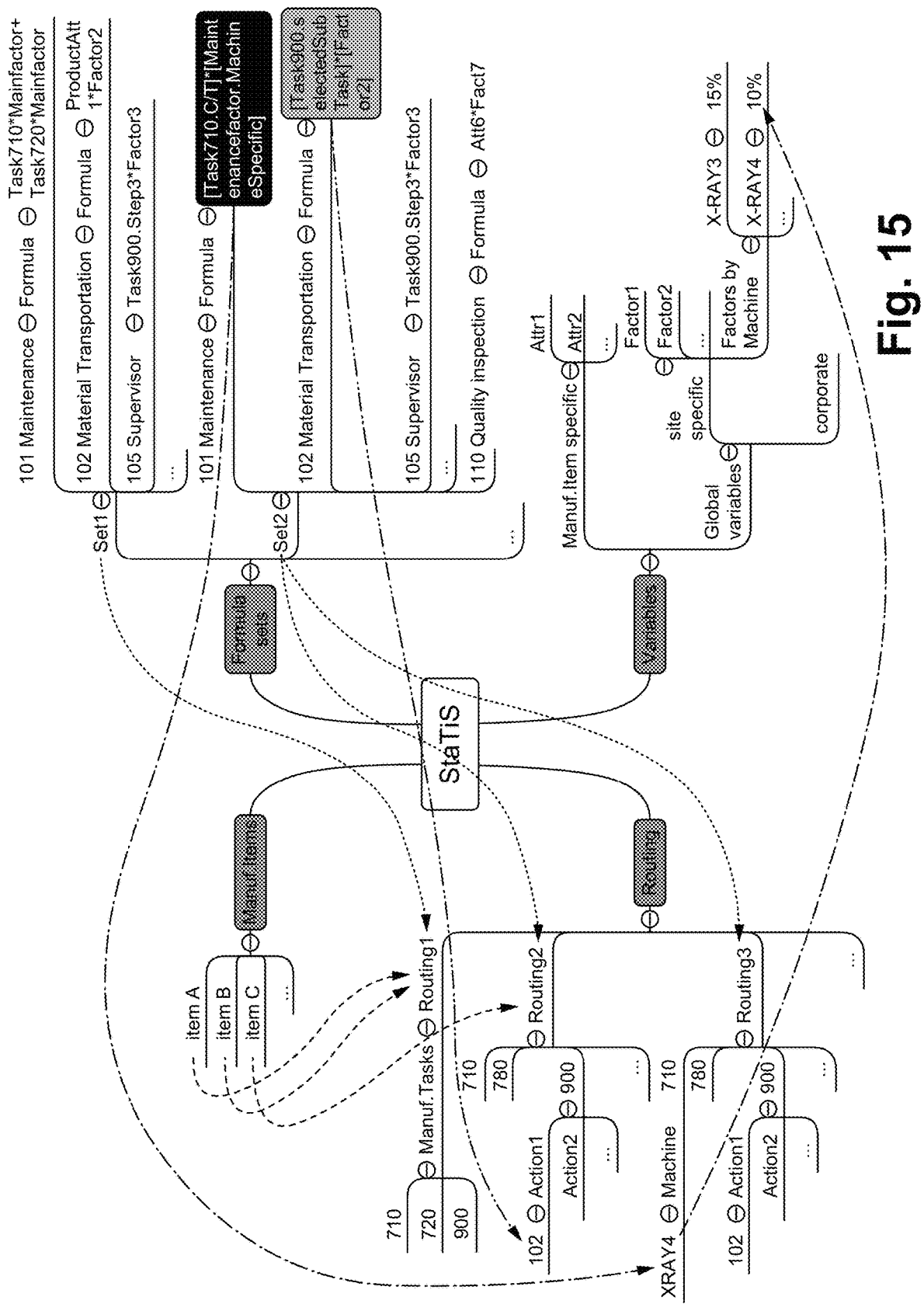
FIG. 15 illustrates an example of the complexity of support task formulas.

The calculation formulas can become very complex as there are many different formulas and influence factors defining the calculation method. FIG. 15 illustrates an example of the complexity of support task formulas. The graphic shown in FIG. 15 is referred to as a mind map and can be visually presented to a user using one of the system GUI tools. In the mind map shown in FIG. 15, mainly the relationship between routing(s) and formula sets (templates) is visualized. In this example. Set1 is assigned to Routing 1 and Set 2 is assigned to Routing 2+3. For each set there are different support tasks and formulas for those support tasks introduced. Those formulas are generated with a formula expression builder in the standard time system. The formulas can link to attributes of the manufacturing tasks, routing or other variables in the system. Example 1: in Set2 for Task: 101 Maintenance there is a calculation formula defined that takes the cycle time of Task 710 and multiplies it with a specific maintenance factor (out of the global variables in the system) by referencing back to the machine to be used. So in this case X-RAY4 is assigned as a machine for that routing, and the system takes 10% as the maintenance factor. If the assigned machine was instead X-RAY3, then the maintenance factor would be 15%. Example 2: In Set 2, for the calculation of the Material Transportation, only the cycle time of Action1 in Task 900 in Routing2 is relevant for the coverage calculation. Coverage is the total time calculated that covers the spent effort and can be calculated as the standard time times the output quantity. Coverage applies for both support tasks and manufacturing tasks. The formula specifies that only sub-tasks are relevant to calculate the effort. In some cases, a support task formula utilizes only a portion of the relevant standard time. For example, only the standard time of a sub-task is used for the support task calculation, not the standard time for all sub-tasks within a given task. Deriving and organizing formulas in this manner keeps the system very flexible and dynamic. No matter what element is changing in the system (formulas, attributes, cycle times, etc.) the calculation will always work as it is calculated based on the formulas and references in the system during run-time.

Figure 16:
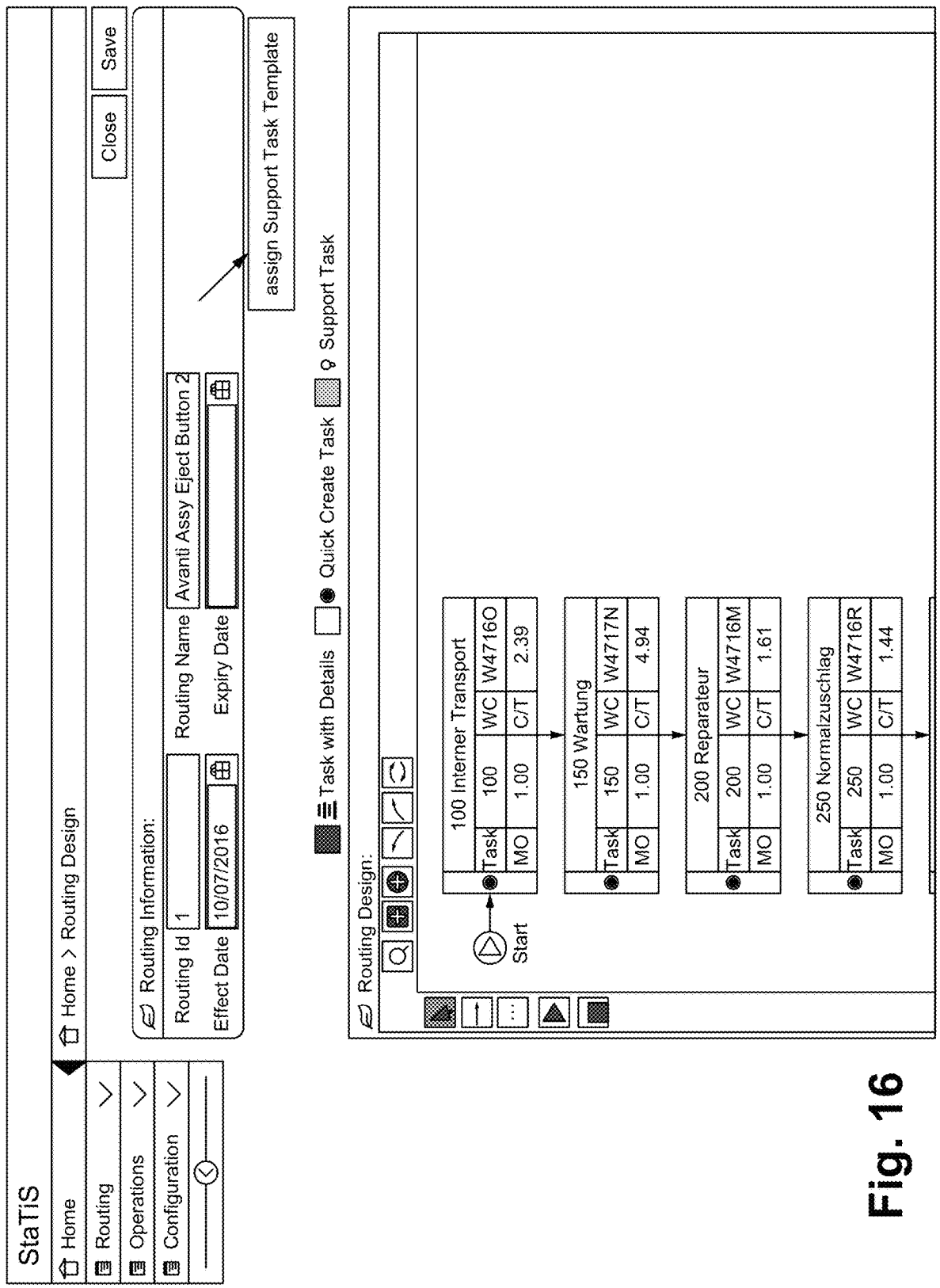
FIG. 16 illustrates a screen shot of an exemplary GUI routing design tool.

A support task template can be readily assigned within the routing design. FIG. 16 illustrates a screen shot of an exemplary GUI routing design tool. The GUI routing design tool includes the GUI routing tool from FIG. 11. Additionally, the GUI routing design tool includes a button labeled "assign Support Task Template" where the calculation formula template can be assigned. By pressing the button "assign Support Tasks Template" one particular, pre-defined template can be selected. Based on the formulas connected to that template the support task standard time is calculated. A "Support Task" calculation tab allows (table-control) the user to check the result of that calculation per support task.

A GUI routing overview tool enables a user to see an overview of all the routings. FIG. 17 illustrates a screen shot of an exemplary GUI routing overview tool. The GUI routing overview tool shows all the routings and can be filter according to all the attributes of a routing. By using the icon in front of each routing record the user can change or delete a routing. The user can also work on item-mappings as well as on the routing data itself. Each routing can be assigned to various different states. Exemplary statuses include simulation, quote, initial, moved to BaaN, preliminary, mature, evaluation and EOL. Simulation status indicates that the routing is not in ERP routing, and that the routing may be include cloned items for simulation purposes. Quote status indicates that the routing is not in ERP routing, and that the routing is only used for calculating standard times for quote purposes. Initial status indicates a routing structure only, which is to be transferred to BaaN where BaaN is a type of ERP system. Moved to Baan status indicates the routing has been moved to the ERP system. Preliminary status indicates that the routing is in the ERP system, data under preparation, estimated C/T's. Mature status indicates the routing is in the ERP system, final data, verified C/T's. Evaluation status indicates the routing is in the ERP system, final data; need to verify in Audit. EOL (End of Life) status indicates the routing is no longer in use.

FIG. 18 illustrates a screen shot of an exemplary GUI item mapping routing tool. By using the form in FIG. 18 the user can map one or multiple manufactured items to the selected routing. One item can only be a member of one specific routing and cannot be mapped to other routings at the same time.

One of the main benefits of the standard time system is the use of system, or global, variables in combination with formulas. One such variable is the allowance factor as previously described. FIG. 19 illustrates a screen shot of an exemplary GUI configuration menu tool. The GUI configuration menu tool enables the allowance factors to be defined as system-global variables. This means that an allowance factor can be defined here and used later on as a link in a routing. The same principle applies for other variables like calculation parameters and factors for support tasks.

Figure 20:
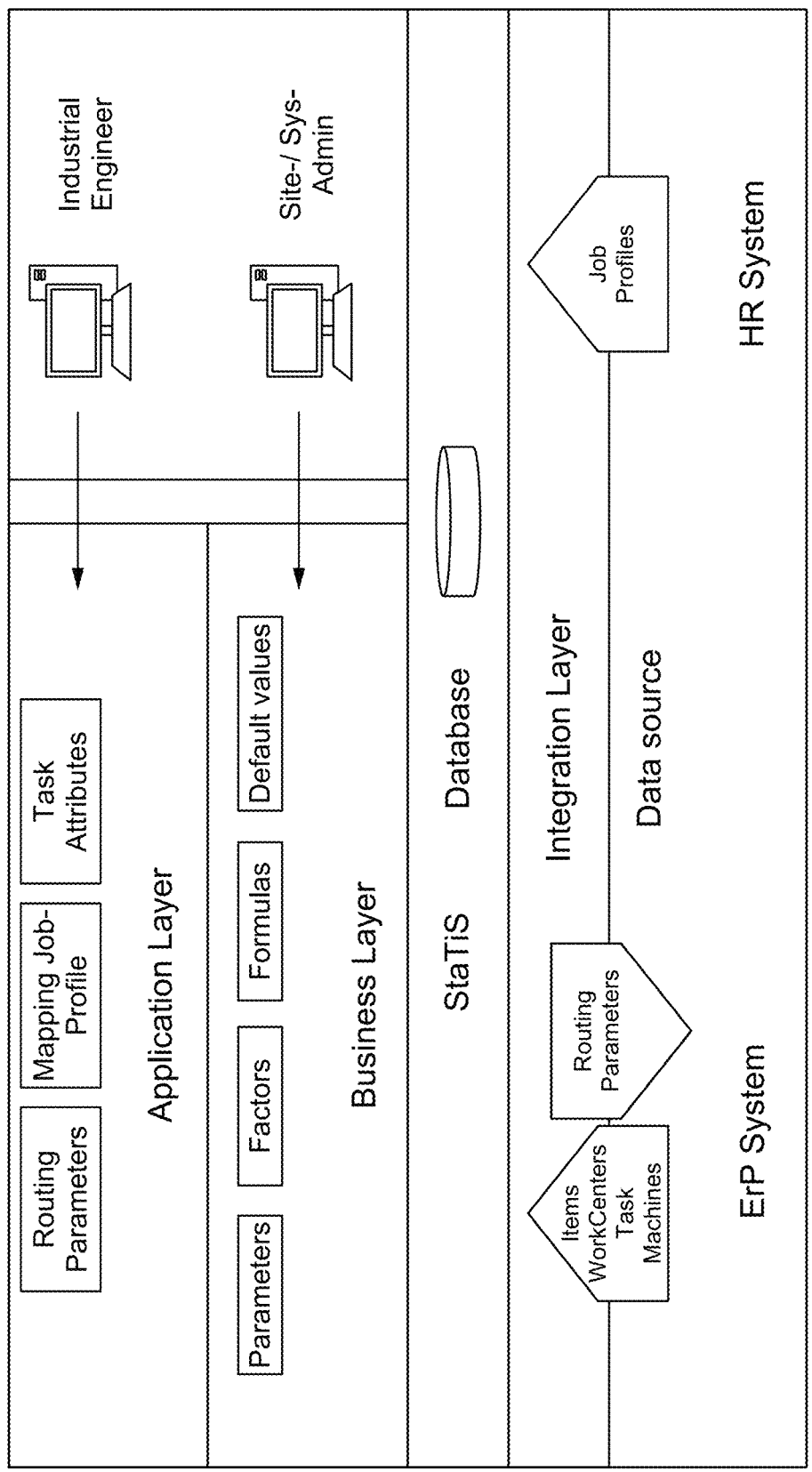
FIG. 20 illustrates the relationships between the various layers used by the standard time system.

In the system architecture, the various GUI tools are organized as a GUI layer. FIG. 20 illustrates the relationships between the various layers used by the standard time system. The application design is visualized with the different layers and shows how data is interfaced and stored and how data is exchanged with other enterprise systems like ERP. The standard time system database is in the middle and is the central data repository for the application. Different user roles and interactions are symbolically indicated with the GUI layer.

The standard time system provides solutions to the problems present with conventional systems. The standard time system provides the methodologies and structures to calculate a high quality set of standard times and routing data. Such high quality information is the basis for planning and scheduling of shop floor orders, the basis for headcount planning, the basis for capacity analysis, the basis for correct throughput-time calculation (production order routing), and provides operation based material back-flushing (accurate material status). The standard time system also provides an efficient tool to maintain the standard time data. The tool enables a data repository that is a single data source for all records, efficient management of data which saves time, the possibility to change global parameters and factors in one place instead of one-by-one, recursive relationship that provide flexible granularity in the data repository, integration with enterprise application for time savings and data quality, and formula based support task calculation for time savings and data quality.

The visualization tool provides a graphical interface where the user sees each station, the actions performed at each station, the standard time of each action and the stations position within the routing. The user also sees if the actions/stations are in parallel or sequential, how many operators, is a machine involved, is there idle time, etc. Recursive relationships can further split down actions to a low granularity while still maintaining visual presentation of the granularity and linking to other actions/stations. Formula based support tasks provide consistent standard time values and if a support task factor changes, the formula for the support task recalculates the standard time. A linking matrix links related attributes and through linking any recalculated values are propagated throughout the manufacturing process. Alternative routing mapping provides extensive flexibility and full resource utilization. Transparency is enabled through waterfall analysis of changes, which provides a record of changes to any change such as a factor value change, change in routing, change in actions/steps. For example, what was changed, who made the change, where was the change, why was the change made. Versioning ensures that each change can be saved as a collective version for the entire process.

The present application has been described in terms of specific embodiments incorporating details to facilitate the understanding of the principles of construction and operation of the standard time system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A system for determining manufacturing processes, the system comprising:
   a. a database configured to store attributes assigned to each of a plurality of manufacturing task, links between manufacturing tasks that define a routing path, a manufacturing task standard time for each manufacturing task, manufacturing task standard time variable values associated with manufacturing task formulas, support task standard time variable values associated with support task formulas, a manufacturing task standard time for each manufacturing task, and a support task standard time for each support task;
   b. an enterprise resource planning system that manages resources corresponding to the manufacturing tasks and support tasks performed in a manufacturing process for each of a plurality of manufactured items and defines specific manufacturing tasks and support tasks associated with each manufactured item; and
   c. a standard time system including a visualization tool having a plurality of graphical user interface (GUI) tools, wherein a first set of GUI tools is configured to:
   assign attributes to each of the plurality of manufacturing tasks and manufacturing task standard time variable values, as entered by a user via the first set of GUI tools, wherein each manufacturing task is defined by a manufacturing task formula that includes one of the manufacturing task standard time variables, the manufacturing task formula calculates the manufacturing task standard time which is a time it takes to perform the manufacturing task,
   arrange the specific manufacturing tasks for each manufacturing process and a corresponding manufactured item as a routing path, as entered by the user via the first set of GUI tools, and to display the routing path as a connected series of block figures that correspond to the specific manufacturing tasks;
   further wherein a second set of GUI tools is configured to:
   assign one or more support task formulas for each routing path according to user input provided via the second set of GUI tools, wherein each support task is an activity that supports one or more of the plurality of manufacturing tasks, and each support task is defined by one of the support task formulas, wherein one or more of the support task formulas include a support task standard time variable a value of which is linked to the calculated manufacturing task standard time for one of the manufacturing tasks, the support task formula calculates a support task standard time which is a time to perform the support task,
   assign values to each of the support task standard time variables, as entered by the user via the second set of GUI tools,
   wherein the database and the visualization tool define a linking matrix that includes links between specific support tasks and one or more specific manufacturing tasks and links between support task formulas and manufacturing task formulas, as defined by the user via the plurality of GUI tools, and to automatically propagate, via the standard time system, a change of a variable value in any variable used in the manufacturing task formulas or the support task formulas to recalculate and update within the database all manufacturing task standard times and all support task standard times linked to the changed variable value by the linking matrix for all manufacturing processes corresponding to the plurality of manufacturing items.

2. The standard time system of claim 1 wherein the support task formula for each support task comprises one or more variables assigned a variable value according to an attribute of a manufacturing task or an attribute of the product being manufactured.

3. The standard time system of claim 2 wherein the attribute of the manufacturing task is the manufacturing task standard time.

4. The standard time system of claim 2 wherein the support task formula for each support task further comprises one or more weighting factors.

5. The standard time system of claim 2 wherein the visualization tool is further configured to display links between specific support tasks and one or more specific manufacturing tasks based on the support task formula of the specific support task and any manufacturing task attributes referenced in the specific support task formula, the totality of the links forming a portion of the linking matrix that is displayed by the visualization tool as a linking matrix map.

6. The standard time system of claim 5 wherein one or more of the variables included in the support task formulas are global variables used in a plurality of support task formulas, further wherein the visualization tool is further configured to link all support tasks having a common global variable in the support task formula and including all such links in the linking matrix.

7. The standard time system of claim 6 wherein the visualization tool is further configured to propagate a change in one of the global variable values to all support tasks linked to the global variable using the linking matrix.

8. The standard time system of claim 1 wherein one or more manufacturing tasks are performed at one of a plurality of stations, wherein each station comprises a different physical location, wherein the visualization tool is further configured to define one or more alternative routing paths, each alternative routing path comprising at least one or more different manufacturing tasks than the routing path or one or more different stations than the routing path.

9. The standard time system of claim 1 wherein one or more manufacturing tasks are sub-divided into sub-manufacturing tasks.

10. The standard time system of claim 1 wherein the visualization tool is further configured to display each manufacturing task as a block figure within a block diagram, and to arrange, according to user input provided via the plurality of GUI tools, select manufacturing tasks as a routing path through a manufacturing facility for the manufacturing process and to display the routing path as a connected series of the block figures that correspond to the select manufacturing tasks, wherein the visualization tool is further configured to define and visually display each of a plurality of alternative routing paths, via the plurality of GUI tools, each alternative routing path comprising at least one or more different manufacturing tasks than the routing path or one or more different stations than the routing path, wherein the routing path and the plurality of alternative routing paths form a matrix of routing paths for which a product is manufactured, and the visualization tool is further configured to display the matrix of routing paths for the manufacturing process via the plurality of GUI tools, further wherein the database is further configured to store links between manufacturing tasks that define the routing path and the plurality of alternative routing paths.

11. The standard time system of claim 10 wherein one or more manufacturing tasks are sub-divided into sub-manufacturing tasks.

12. The standard time system of claim 11 wherein the visualization tool is configured to graphically enable a user to build the routing path and the plurality of alternative routing paths using on-screen building blocks and forms linked to each building block, each building block represents one of the manufacturing tasks and each define an activity associated with the manufacturing task, the station associated with the manufacturing task, and one or more attributes associated with the manufacturing task.

13. The standard time system of claim 1 wherein the visualization tool is further configured to generate and display the linking matrix as a linking matrix map that is a visual representation of the interconnections between the routing paths and a formula set corresponding to each routing path, the formula set includes the manufacturing task formula for each of the arranged select manufacturing tasks and the support task formula for each of a select support task linked to the arranged select manufacturing tasks.

14. The standard time system of claim 13 wherein the visualization tool is further configured to define and display one or more alternative routing paths for each manufacturing process and to generate and display the linking matrix map that visually represents the interconnections between the routing paths, the one or more alternative routing paths, and the formula set corresponding to each of the routing paths and the one or more alternative routing paths.

15. The standard time system of claim 1 wherein the visualization tool is configured to arrange each routing path by dragging and dropping the block figures on the display.

16. The standard time system of claim 1 wherein the manufacturing process defines select manufacturing tasks and select support tasks for manufacturing a specific manufactured item, and the visualization tool is further configured to determine a total standard time for manufacturing the specific manufactured item by adding the manufacturing task standard time for each select manufacturing task and the support task standard time for each select support task defined in the routing path corresponding to the specific manufactured item.

* * * * *